United States Patent
Harville et al.

(10) Patent No.: US 7,149,961 B2
(45) Date of Patent: *Dec. 12, 2006

(54) AUTOMATIC GENERATION OF PRESENTATIONS FROM "PATH-ENHANCED" MULTIMEDIA

(75) Inventors: Michael Harville, Palo Alto, CA (US); Ramin Samadani, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 337 days.

This patent is subject to a terminal disclaimer.

(21) Appl. No.: 10/427,582

(22) Filed: Apr. 30, 2003

(65) Prior Publication Data

US 2004/0218894 A1  Nov. 4, 2004

(51) Int. Cl.
G06F 15/00 (2006.01)
G01C 21/26 (2006.01)
G08G 1/123 (2006.01)

(52) U.S. Cl. .................. 715/501.1; 701/200; 701/201; 340/995.1; 340/995.18

(58) Field of Classification Search ............. 715/500.1; 701/200, 202, 208; 345/419; 340/990, 995.1, 340/995.14, 995.18; 348/231.1, 231.3, 231.6
See application file for complete search history.

(56) References Cited

U.S. PATENT DOCUMENTS

| 5,296,884 | A | | 3/1994 | Honda et al. |
|---|---|---|---|---|
| 5,422,814 | A | | 6/1995 | Sprague et al. |
| 5,642,285 | A | | 6/1997 | Woo et al. |
| 5,726,660 | A | | 3/1998 | Purdy et al. |
| 5,945,985 | A | * | 8/1999 | Babin et al. ............. 715/500.1 |
| 6,144,375 | A | | 11/2000 | Jain et al. |
| 6,148,260 | A | * | 11/2000 | Musk et al. ................. 701/200 |
| 6,173,239 | B1 | | 1/2001 | Ellenby |
| 6,282,362 | B1 | | 8/2001 | Murphy et al. |
| 6,504,571 | B1 | | 1/2003 | Narayanaswami et al. |
| 6,636,803 | B1 | * | 10/2003 | Hartz et al. ................. 701/208 |
| 6,904,160 | B1 | * | 6/2005 | Burgess ..................... 382/113 |
| 2002/0011951 | A1 | * | 1/2002 | Pepin et al. ........... 342/357.13 |
| 2003/0024975 | A1 | | 2/2003 | Rajasekharan |
| 2005/0012743 | A1 | * | 1/2005 | Kapler et al. ............... 345/419 |

FOREIGN PATENT DOCUMENTS

| EP | 1054331 | 11/2000 |
|---|---|---|
| EP | 1128284 | 8/2001 |
| EP | 1139116 | 10/2001 |
| EP | 1139681 | 10/2001 |
| EP | 1146467 | 10/2001 |
| EP | 1158822 | 11/2001 |

(Continued)

OTHER PUBLICATIONS

Smith et al., Geographic Information Systms and Libraries: Patrons, Maps, and Spatial Information, Papers presented at the 1995 Clinic on Library Applications of Data Processing, pp. 80-121.*

(Continued)

*Primary Examiner*—Heather R. Herndon
*Assistant Examiner*—Maikhanh Nguyen

(57) ABSTRACT

A "path-enhanced" presentation is automatically generated from previously recorded "path-enhanced" multimedia based on time and location information associated with the multimedia. The path based on the time and location information is rendered over a two-dimensional map. The presentation indicates position and progress along the path, and at the same time, previously recorded multimedia corresponding to points or segments of that path are automatically played. When the moving icon reaches a location that is associated with multimedia, that multimedia is automatically played.

27 Claims, 8 Drawing Sheets

FOREIGN PATENT DOCUMENTS

| | | |
|---|---|---|
| WO | WO9821688 | 5/1998 |
| WO | WO9854896 | 12/1998 |
| WO | WO9918732 | 4/1999 |
| WO | WO0072577 | 11/2000 |
| WO | WO0144978 | 6/2001 |
| WO | WO0154021 | 7/2001 |
| WO | WO0163479 | 8/2001 |
| WO | WO0233955 | 4/2002 |

OTHER PUBLICATIONS

Smith, T. R., A Digital Library for Geographically Referenced Materials, IEEE Computer, 1996, pp. 54-60.*

Christel et al., "Interactive Maps for a Digital Video Library", IEEE Multimedia, 2000, pp. 60-67.*

Red Hen Media Mapper, "Welcome to MediaMapper.com", 2002, pp. 1-12.*

* cited by examiner

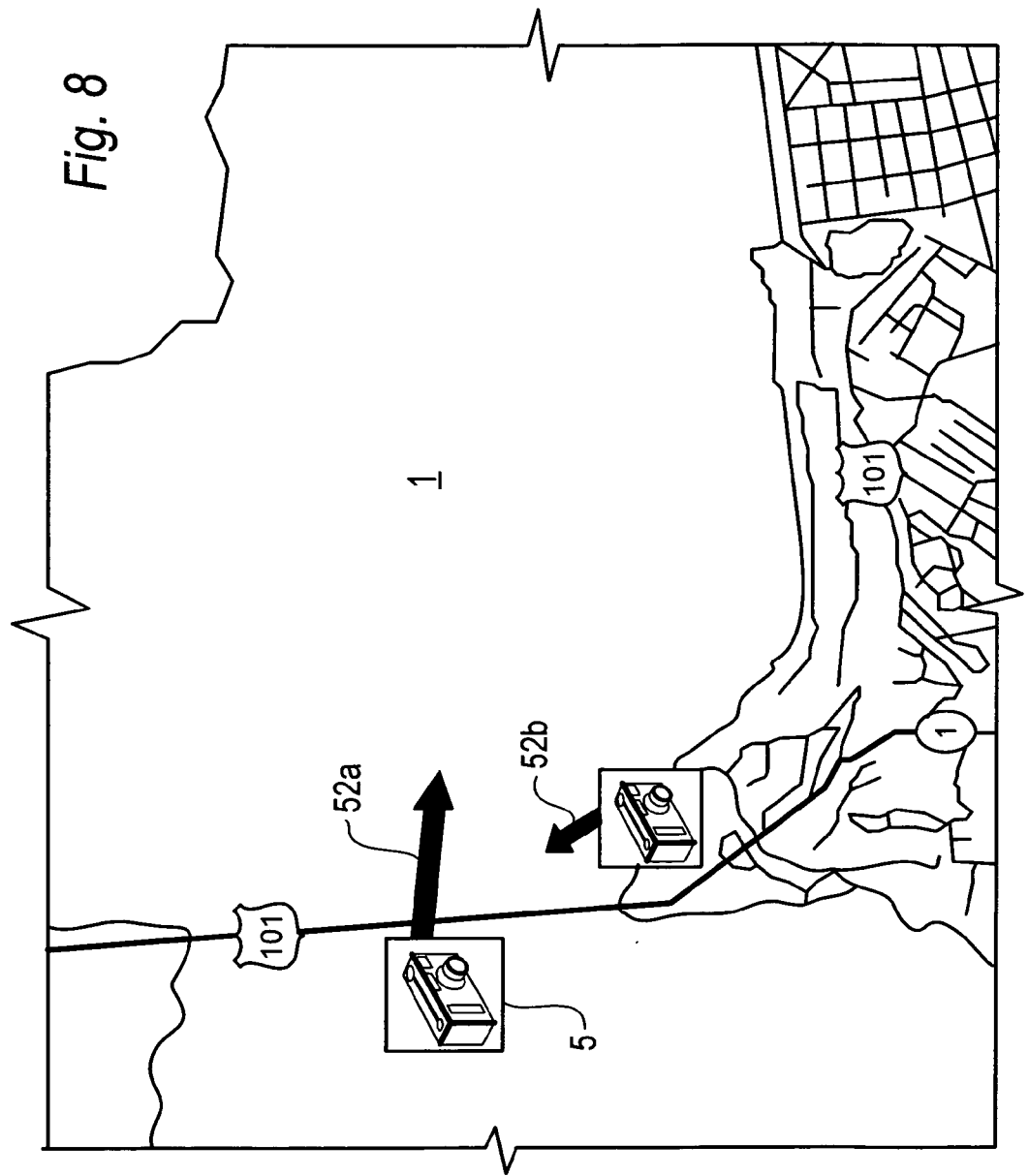

AUTOMATIC GENERATION OF PRESENTATIONS FROM "PATH-ENHANCED" MULTIMEDIA

CROSS-REFERENCE TO RELATED APPLICATIONS

Our commonly assigned patent application U.S. application Ser. No. 10/427,614 filed concurrently herewith, entitled "Apparatus and Method for Recording "Path-enhanced" Multimedia", describes a new multimedia recording appliance that can record audio, still images or video individually or in combinations, and that is capable of sampling time and position information whether or not it is recording any multimedia, thereby providing a record not only of particular sounds and images, but also of a path traveled during and between the recording of those sounds and/or images. The recorded data that this appliance generates are examples of "path-enhanced" multimedia, and the identified patent application is hereby incorporated by reference in its entirety.

Other commonly assigned patent applications filed concurrently herewith describe various other contemplated applications for "path-enhanced" multimedia technology, and each of the following identified patent applications is also hereby incorporated by reference in its entirety:

U.S. Pat. No. 6,906,643 issued Jun. 14, 2005 "Systems and Methods of Viewing, Modifying, and Interacting with "Path-enhanced" Multimedia" relates to systems and methods which use a path derived from spatial and temporal relationships to explore, enhance and edit a sequence of text, sounds, still images, video and/or other "multimedia" data associated with the path. Moreover, the data defining any such associated path may also be edited to thereby define a new or modified path.

U.S. patent applications Ser. No. 10/427,647 "Indexed Database Structures and Methods for Searching Path-Enhanced Multimedia" relates to database structures and data searching procedures for recorded data having associated times and locations.

FIELD OF THE INVENTION

The present invention relates generally to multimedia presentations, and more specifically to apparatus and methodology for generating a presentation of multiple recorded events.

BACKGROUND

According to one known technique of presenting multimedia, a slide show presentation of photos is automatically displayed to a user. For example, a set of still photos are automatically displayed in a slide show presentation such that photos are displayed for a predetermined amount of time, with a transition (e.g. a cross-fade) between each displayed photo. The presentation can be customized by the user in that the user can select which photos to include, what type of transition is to be used between the photos, and the length of time each photo is displayed in the presentation.

According to another known technique, multimedia data with attached GPS data from a known recording device can be presented by displaying maps overlaid with icons that may be selected in order to access and view the multimedia.

However, none of these presentation techniques include or display path information relating to the location and times associated with the displayed multimedia.

BASIC CONCEPTS AND DEFINITIONS

Multimedia

Although "multimedia" has been variously used in other contexts to refer to data, to a sensory experience, or to the technology used to render the experience from the data, as used herein it broadly refers to any data that can be rendered by a compatible machine into a form that can be experienced by one or more human senses, such as sight, hearing, or smell. Similarly, although "multimedia" has been used elsewhere specifically in connection with the presentation of multiple sensory experiences from multiple data sources, as used herein it is intended to be equally applicable to data representative of but a single sensory experience. Common examples of such multimedia include data originally captured by physical sensors, such as visible or IR images recorded by photographic film or a CCD array, or sounds recorded by a microphone, or a printed publication that has been microfilmed or digitized. Other currently contemplated examples include data that is completely synthesized by a computer, as for example a simulated flight in space, digital text (in ASCII or UNICODE format) that can be rendered either as a page of text or as computer generated speech, or data representative of certain physical properties (such as color, size, shape, location, spatial orientation, velocity, weight, surface texture, density, elasticity, temperature, humidity, or chemical composition) of a real or imaginary object or environment that could be used to synthesize a replica of that object or environment. Multimedia data is typically stored in one or more "multimedia files", each such file typically being in a defined digital format.

Location

Location may be defined in terms of coordinates, typically representative of the user's position on the Earth's surface. Many coordinate systems are commonly used in celestial mechanics and there are known transformations between the different coordinate systems. Most coordinate systems of practical interest will be Earth centered, Earth-fixed (ECEF) coordinate systems. In ECEF coordinate systems the origin will be the center of the Earth, and the coordinate system is fixed to the Earth. It is common to model the Earth's shape as an ellipsoid of revolution, in particular an oblate spheroid, with the Earth being larger at the equator than at the poles. The World Geodetic System 1984 (WGS84) is an example of such a coordinate system commonly used in GPS applications. Within the WGS84 system, latitude and longitude will define any location on the Earth's surface. Any other generalized coordinate system, instead of latitude and longitude, defined on the ellipsoid, could be used to reference locations on the Earth. For some applications, a third coordinate, altitude will also be required. In GPS applications, altitude typically measures the distance not above the actual terrain, but above (or below) the aforementioned oblate spheroid representation of the Earth. In other applications, location could be represented in a one-dimensional coordinate system, corresponding for example to mileposts or stations (or even scheduled time) along a predetermined route.

Time

Similar to location, there are many methods for representing time. In many data processing applications, time is defined as the numerical representation of the time difference between the current time and an absolute reference time using some time scale. Local time may be calculated from this numerical representation by using additional latitude and longitude information.

Coordinated Universal Time (UTC) is a modern time scale that serves as an example of the time scale used in these inventions. The UTC time scale defines a very steady second and it is also tied to the earth's rotation. The second is defined in terms of the duration of a given number of periods of the radiation produced by the atomic transitions between two hyperfine levels of the ground state of cesium-133. In addition, the UTC system is synchronized to drifts in speed of the Earth's rotation by the addition of leap seconds.

Path

As used herein, "path" means an ordered sequence of locations (from GPS or otherwise; it may include latitude, longitude and/or altitude) each having an associated sequential time stamp (typically from GPS, from other wireless services, and/or from an internal clock or counter). Equivalently, a "path" may be thought of as a sequence of time data, each associated with a respective location from a sequence of locations.

"Path-Enhanced" Multimedia (PEM)

The association of path information (e.g., time and location data) and multimedia generates "path-enhanced" multimedia. Path information is recorded for the path traveled between and during the recording of the individual recorded multimedia files. In other words, the path information includes path times and locations at which multimedia was and was not recorded. Note that one multimedia file associated with a given point on a path can correspond to more than a single instant of time, and that more than one multimedia file can be associated with the same point.

"Path-Enhanced" Presentation

A "path-enhanced" presentation is automatically generated from previously recorded "path-enhanced" multimedia based on time and location information associated with the multimedia. A path based on the time and location information is preferably rendered over a two-dimensional map. The presentation preferably indicates position and progress along the path, and at the same the previously recorded multimedia corresponding to points or segments of that path are automatically played in roughly the same time sequence. In one embodiment, during a presentation in which a map is displayed, progress along the path may be indicated in an animated fashion as a moving pointer or icon on the map. When the moving icon reaches a location that is associated with multimedia, that multimedia is automatically played or otherwise rendered for user consumption.

BRIEF SUMMARY OF INVENTION

A method of generating a multimedia presentation from "path-enhanced" multimedia data is described. The "path-enhanced" multimedia data includes essentially continuous path information associated with a path and at least one multimedia data file associated with at least one point along the path. According to one embodiment, the method is performed by obtaining map rendering information dependent on the path information and generating information for rendering the path and sequentially rendering the at least one multimedia data file associated with the at least one point along the rendered path dependent on the path information and the associated at least one multimedia data file. A multimedia presentation is then renderable according to the map rendering information and the information for rendering the path and the at least one multimedia data file.

A system for generating a data structure corresponding to a multimedia presentation from "path-enhanced" multimedia is described. In one embodiment, the system includes a "path-enhanced" multimedia analyzer for obtaining map rendering information dependent on the path information and a playlist generator for generating information for rendering the path and sequentially rendering the at least one multimedia data file associated with the at least one point along the rendered path dependent on the path information and the associated at least one multimedia data file.

The invention is defined in the appended claims, some of which may be directed to some or all of the broader aspects of the invention set forth above, while other claims may be directed to specific novel and advantageous features and combinations of features that will be apparent from the Detailed Description that follows.

BRIEF DESCRIPTION OF DRAWINGS

FIG. 8 illustrates a symbolic representation of a field-of-view rendered on a map.

DETAILED DESCRIPTION OF EXEMPLARY EMBODIMENTS

Figure 1:
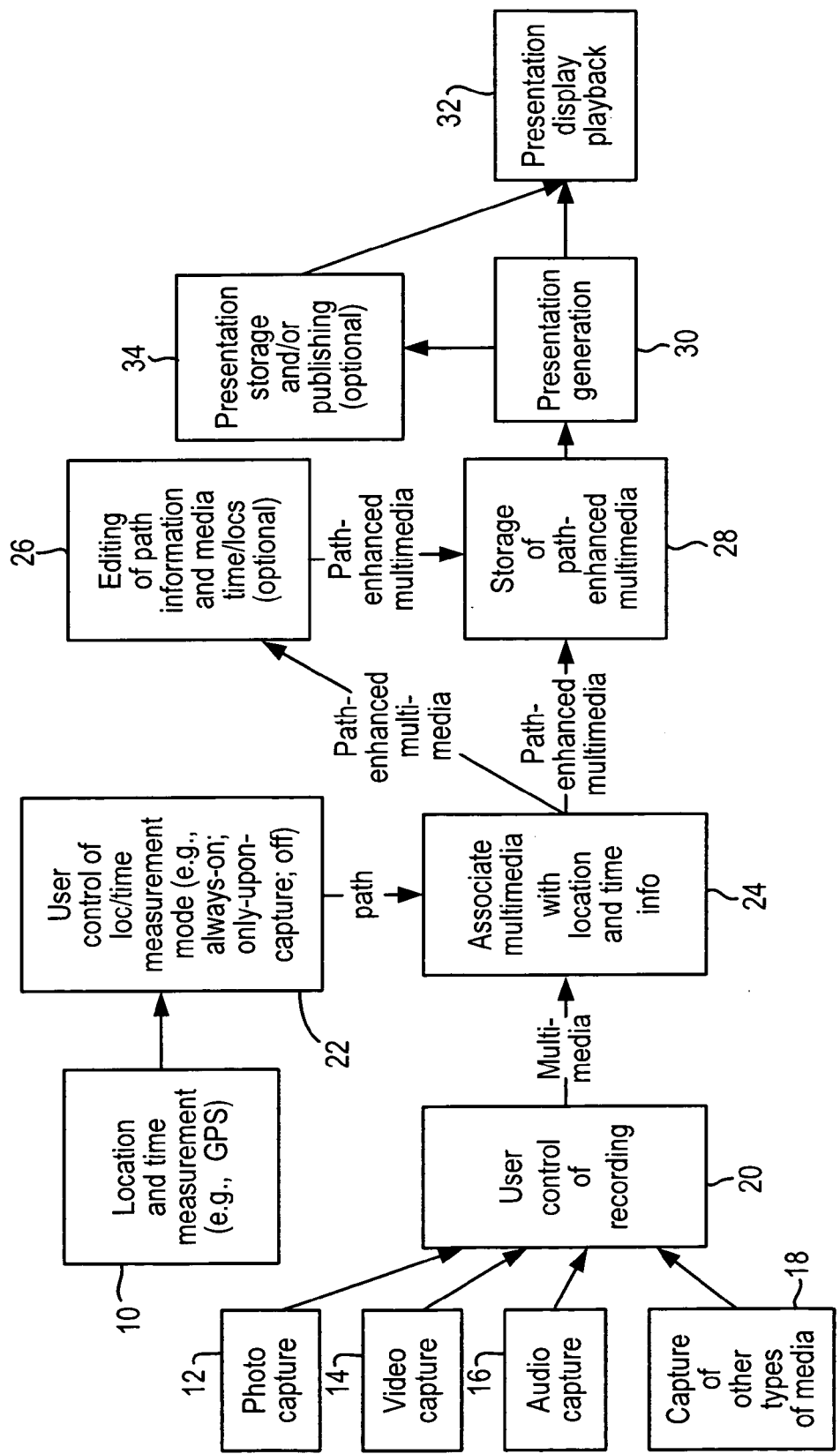
FIG. 1 is a diagrammatic overview of one embodiment of a system for capturing and presenting "path-enhanced" multimedia.

The block diagram in FIG. 1 provides an overview of how "path-enhanced" multimedia may be captured and presented. As described in more detail in the referenced co-pending application entitled, "Apparatus and Method for Recording "Path-Enhanced" Multimedia", location and time data 10 (i.e., path information) may be recorded concurrently with the multimedia 12, 14, 16, 18 by means of a suitable "path-enhanced" multimedia recording device (not shown) incorporating a GPS (Global Positioning System) receiver. However, other methods, including manual labeling of multimedia, or device location tracking based on signals received from ground-based electronic transmitters, might also be used as sources of path information. If a recording device is used to associate path information with multimedia, the recording device preferably possesses user controls (block 20) for selecting when and what media type is to be recorded, as well as user controls for selecting an appropriate location/time recording mode (block 22) (such as "continuous", "during media capture only", or "off"). It is contemplated that path information may exist for times before, between, and after those at which multimedia were captured. For example, the "path-enhanced" multimedia recording devices described in the referenced co-pending application entitled "Apparatus and Method for Recording "Path-Enhanced" Multimedia" are capable of recording path information continuously, whether or not multimedia is being captured. Such a more complete set of path data permits the construction at a later time of a more detailed and interesting animation of all of the user's travels during some period in which multimedia were captured. Location data can include two-dimensional global positioning coordinates such as latitude and longitude, and possibly also elevation relative to sea level.

When the multimedia and path information (location/time) data streams are associated (block 24), the result is a "path-enhanced" multimedia data stream, which may then be edited and enhanced (block 26) and stored (block 28) for subsequent viewing and processing. Methods for editing, enhancing, storing, and displaying a "path-enhanced" multimedia stream are described in the referenced co-pending application entitled "Systems and Methods of Viewing, Modifying, and Interacting with "Path-Enhanced" Multimedia". Such a "path-enhanced" multimedia data stream serves as input to the "Presentation Generation" block 30 in accordance with the present invention of FIG. 1. The generated presentation may then be automatically played back to the user (block 32) and/or stored and/or published (block 34) for later viewing by others.

Figure 2:
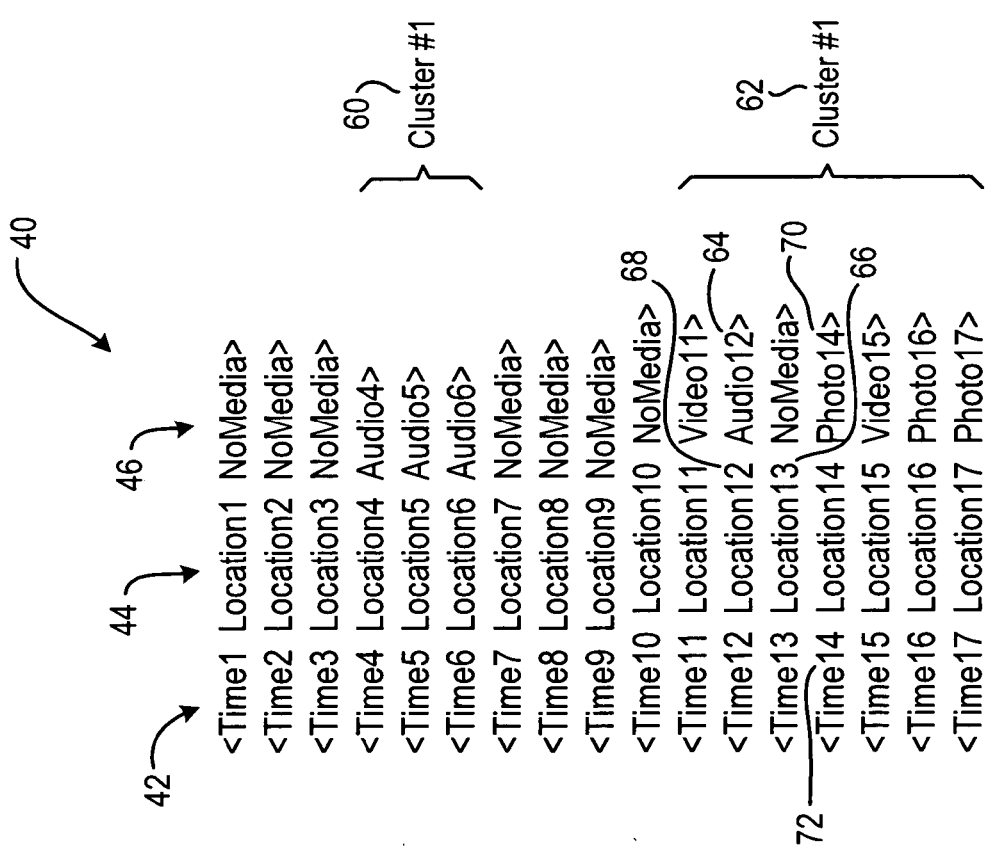
FIG. 2 is a representation of an exemplary list of "path-enhanced" multimedia.

As depicted in FIG. 2, the "path-enhanced" multimedia stream 40 can be represented abstractly as a list of three-tuples 42, 44, 46, each of which contains Time data (including both date and time) 42, Location data 44 (which may consist of latitude, longitude, elevation, and other data, as described above), and an optional reference 46 to a Media-File whose capture was initiated at (or is otherwise to be associated with) that particular Time and Location. The list of FIG. 2 is a short, simplified example of the "Path-Enhanced" Multimedia (PEM) data structure as described in the referenced co-pending application entitled "Systems and Methods of Viewing, Modifying, and Interacting with "Path-enhanced" Multimedia". Each multimedia file in the list may itself be associated with additional informational tags, such as the capture device settings, the name of the person performing the capture, and so on. The following discussion assumes that each multimedia file is an audio recording, a photograph, a video file with optional accompanying audio, or a text file, and that the multimedia files are already sorted in order of increasing time, but those skilled in the art will realize that the disclosed methodology can readily be adapted for use with other types of multimedia and with multimedia that is not necessarily time ordered.

List entries 48,50,52 with associated multimedia files 54,56,58 are preferably grouped, as indicated, into Clusters 60,62 according to similarities in recording time and location. Such a clustering can be done manually, or automatically at the time of recording, or preferably (as described in more detail below) at the time the presentation is being generated.

In practice, the rate of location and time sampling will typically be much higher than the rate at which multimedia recordings are initiated, and therefore the fraction of list entries without associated multimedia file references may be much higher than is indicated in FIG. 2. For instance, when a GPS receiver is used to measure time and location, readings might be obtained several times a minute, which is much more frequent than most people's rate of taking pictures or turning on and off their video or audio recorders. However, the list 40 shown in FIG. 2 will be useful for illustrative purposes in the following descriptions.

As discussed above, list entries that reference multimedia contain the time and location at which recording of the multimedia was initiated. It is possible that, after a list entry containing a multimedia file reference, additional entries will occur with times preceding that at which recording was terminated for the previously referenced media file. The time at which recording of a media file terminates can be computed from its recording initiation time together with the recording duration, which is typically contained in the media file itself for many known multimedia formats. The entries that occur before termination of media file recording can be used to determine the path traveled by the person while the media was being captured. In the example list of FIG. 2, for instance, it is possible that the recording of "Audio12" 64 ended after the person had traveled to "Location13" 66, so that the person's path while he or she was recording "Audio12" can be estimated as extending from "Location12" 68 to "Location13". Note that it is also possible that more than one type of media can be recorded at once, so that the list may contain entries whose recording durations overlap. For instance, in the example list above, "Photo14" 70 may have been taken while recording of "Audio12" 64 was still in progress, so that the recording end-time of "Audio12" is later than "Time14" 72. The example methods for automatic presentation generation described below handle all of these cases.

As used herein, a "path segment" refers generally to a portion of a path. For instance, a path segment might refer to the implied straight-line path connecting two consecutive entries in a "path-enhanced" multimedia list, or it might refer to the path approximated by connecting a group of such consecutive entries, or it might refer to a particular spline or loop in a path, or it might refer to the path connecting two or more "multimedia clusters" (see 105) or other locations of interest.

Figure 3:
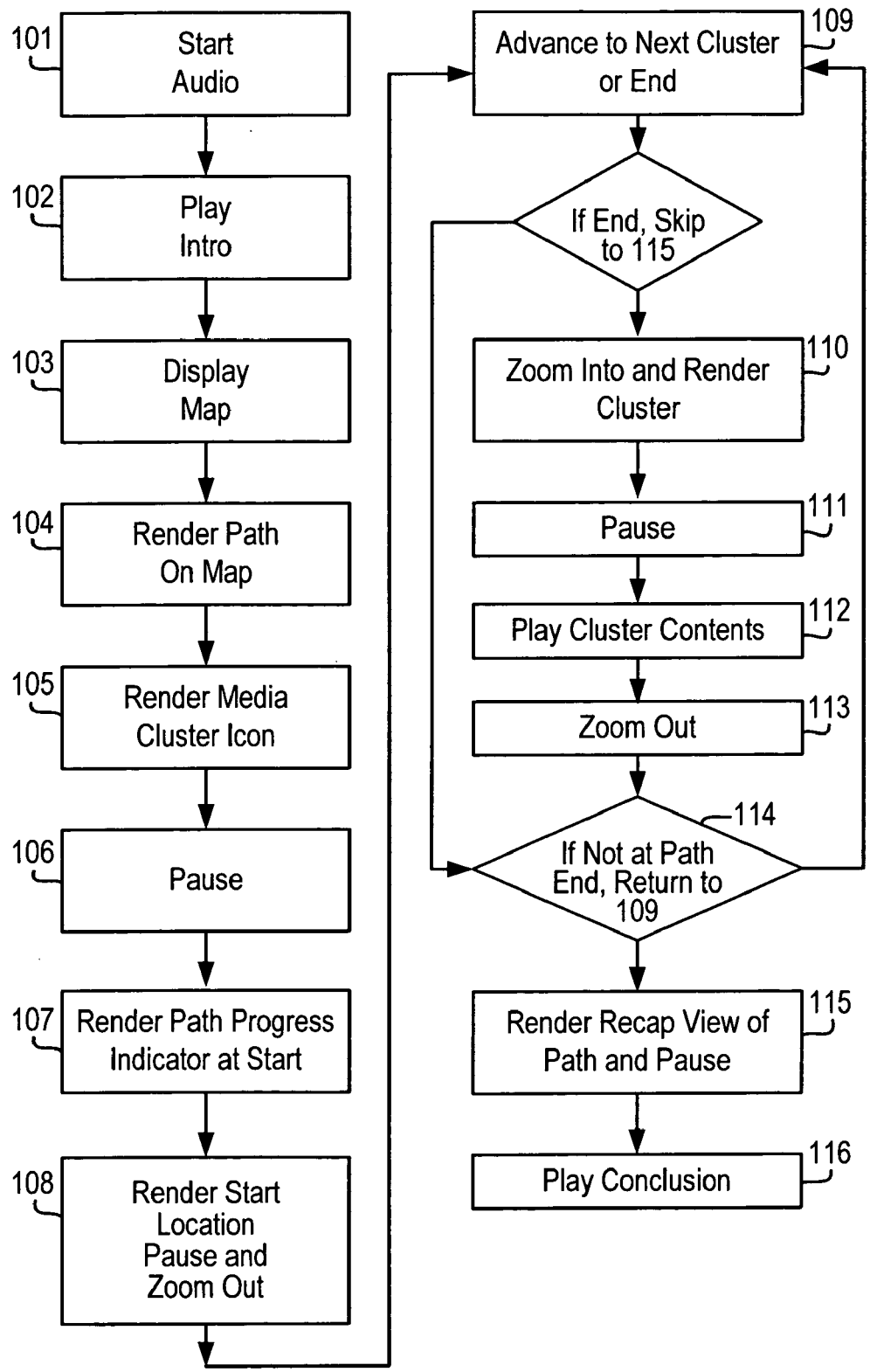
FIG. 3 is a flowchart of an exemplary process for automatically performing a multimedia presentation.

An exemplary embodiment of a method for playing a "path-enhanced" multimedia presentation of, for example, a trip will not be described in detail, with reference to FIG. 3. Note that other embodiments of the method for playing a "path-enhanced" multimedia presentation may or may not include some of the elements shown in FIG. 3.

Method for Playing a "Path-Enhanced" Multimedia Presentation

101: Initiate Play of Presentation Background Audio Accompaniment

A presentation may be associated with a selection of auxiliary audio content (also referred to as background audio accompaniment) to be played concurrently with the presentation in a background accompaniment mode. The auxiliary audio content may or may not be the audio that was captured during the trip (i.e., audio from the "path-enhanced" multimedia). In one embodiment, the volume of the auxiliary audio content is lowered (optionally to silence) when audio multimedia captured during the trip is played (see block 112) during the course of the presentation. The background audio accompaniment may also contain periods of silence.

The background audio accompaniment can include a list of individual audio elements, such as songs, musical pieces, sound effects, or famous audio speech clips. This list may be associated with a list of times at which to initiate play of selected audio elements during the presentation. If so, the presentation player simply plays the selected audio elements at the designated times, transitioning from and/or terminating play of any previous audio element that is still being played when play of a new audio elements is to be started. If no list of times at which to start play of selected audio elements is provided, then the playing of the audio background accompaniment may also contain a process for dynamically selecting audio elements to play and deciding when to play them. Any known method may be used for this.

According to one method, audio elements are randomly selected from the list of audio elements, and then played once in sequence. In this method, if all audio elements are played before the presentation ends, then the random selection process begins again for the complete list of audio elements, such that some of the audio elements may be played more than once during a presentation. Cross-fading, audio pauses, and other well-known audio transition effects may be applied when transitioning from the playing of one audio element to the next.

102: Play Presentation Introduction

A "presentation introduction", which can include a series of images and/or videos, is played. Introductory images and videos may have any sort of background (such as a solid color, graphical art, or a photo), and may contain text indicating any of a variety of pieces of information, including the title of the presentation, the dates of multimedia capture, names for the places encompassing the multimedia capture locations, the current date, and the identity of the person who recorded the multimedia or who is currently presenting it. They may contain various types of statistics relating to the captured "path-enhanced" multimedia data, such as the total duration of the trip, the number of photos and videos recorded, or the duration of the presentation about to be shown. They may also contain one or more stock photos, drawings, or videos relevant to the content of the presentation, such as a picture of the Eiffel Tower if the path information indicates that multimedia was recorded in Paris.

103: Display Overview Map

A map is displayed having geographical bounds encompassing the entire path associated with the captured in the "path-enhanced" multimedia. In one embodiment, the scale of the displayed map does not greatly exceed that of the geographical bounds of the path locations, so that different locations on the map at which multimedia was recorded, or clusters of these locations, will be more easily distinguishable when overlaid upon the map. The map may be of any of a variety of styles, such as a road atlas, a tourist map with marked locations of interest, or a satellite photograph.

104: Render Trip Path as an Overlay on the Map

The path that the capturer(s) of the multimedia data traveled is rendered on the displayed map in any of various ways, such as that shown in FIG. 3 is a flowchart of an exemplary process for automatically performing a multimedia presentation., in which a map 1 of San Francisco is overlaid with a path 2. In embodiments in which the path is represented as an ordered list of 2D coordinates in the coordinate system of the map, one simple method for rendering the path is to connect each pair of successive coordinates in the list with a straight-line segment. The locations of the list entries themselves may optionally be indicated with a small dot or other shape that differentiates it from the path segments. For other representations of the path, such as concatenations of B-spline or cubic-spline curves, other appropriate and well-known methods may be used to render the path shape.

105: Render Multimedia Cluster Icons as an Overlay on the Map

Clusters of multimedia icons are overlaid on the displayed map. In many contexts, people do not record multimedia such as photos and videos at regular time intervals or at regular spacing along their travels, but instead record multimedia in bursts, perhaps when they arrive at some destination of interest or when some interesting event occurs. This practice of multimedia recording lends itself to the automatic detection of these "clusters" of captured multimedia, and the organization of the trip presentation around these clusters. FIG. 2 shows an example of "path-enhanced" multimedia list entries that have been grouped into clusters 60,62 according to similarities in the recording times and locations of the multimedia.

Each cluster is represented with an icon on the displayed map and, in one embodiment, is drawn near the mean location of the list entries associated with the cluster. All cluster icons in a presentation may have the same appearance, or they might have individually customized appearances that depend on factors such as their ordering along the path, their multimedia contents, or their geographic location. For instance, the cluster icons could simply contain the sequential numbers of the clusters in their order along the path (e.g. "1" for the first cluster along the path, "2" for the second, and so on). A cluster icon might also contain an image derived from any of the visual multimedia in the cluster. For instance, an icon might contain a low-resolution version of one of the frames in a video associated with the cluster, or it might contain a cropped version (perhaps focusing on a face or building) of one of the photographs associated with the cluster. The icon may also contain text annotations or optionally modified stock images associated with the geographic area near the cluster. For instance, a cluster located near the Eiffel Tower in Paris may be given an icon with a stock photo or other representation of the Eiffel Tower, or it may contain the text "Eiffel Tower".

106: Pause to Allow Viewer to Study Map

After the map has been displayed, the trip path rendered, and the multimedia capture locations marked with cluster icons, the presentation can pause for some period of time to allow the viewer to absorb the overall context for the map and the overlaid path and multimedia icons. After this, the presentation begins to re-trace the route taken by the traveler, displaying the multimedia captured along the way.

107: Draw Path Progress Indicator at Beginning of Trip Path

During the presentation, progress along the path is indicated in some way by an indicator denoted herein as the "Path Progress Indicator". One type of Path Progress Indicator, referred to herein as a "Current Location Icon", is an icon that is drawn to represent the position of the person who recorded the multimedia during the trip, and therefore moves along the path as the presentation is played. This block draws the Current Location Icon at the first location on the path. The icon may have any of a variety of styles, including for example but not limited to:

- a colored dot with width twice that of the line used to draw the path
- a large arrowhead oriented along the direction that the path is traveled
- a drawing of some sort of vehicle, such as a car, airplane, or boat
- an animation (a series of images that loop continuously) of something walking, such as a person or a camel. The animated person could be a custom caricature of the person who actually took the trip.

Depending on user preferences selected for the presentation generation process, the appearance of the Current Location Icon may vary during the course of the presentation. For instance, an "airplane" icon might be used for a path segment that appears to cover a large distance in a short time, while a "walking person" icon might be used for path segments that appear to meander slowly through an urban area and are associated with many multimedia files. Methods for choosing the Current Location Icon are described herein below.

Another way to represent progress along the path is through dynamic modifications to the appearance of the path itself, without any use of a Current Location Icon. More specifically, the current location may be indicated by rendering path segments that have already been traversed in one style, and path segments yet to be traversed in another style. In such a method, the Path Progress Indicator is thus visible as the junction at which the path rendering style changes. When this style of Path Progress Indicator is used, nothing needs to be rendered according to this block, although the start of the path may be highlighted in some way to draw the viewer's attention to it.

108: Zoom into First Path Location

If necessary, the display of the presentation is "zoomed" (i.e., magnified) onto the first path location so that the viewer is able to see more detail about the start of the trip. In one embodiment, the zooming causes the first path location and some small number of multimedia cluster icons, perhaps just one, to be visible and to span most of the display.

109: Animate Path Progress Indicator until Next Multimedia Cluster or End of Path is Reached If a Current Location Icon is being used as the Path Progress Indicator, the icon is animated so that it moves along the path in the direction corresponding to increasing time. Animation of the Current Location Icon continues until it reaches the first multimedia cluster icon along the path. Many choices can be made for the manner in which to animate the icon and the rate at which to move it along the path, as will be described herein below. For example, the icon might be moved along the path at a rate proportional to, and faster than, that actually traveled by the capturer of the multimedia, or it might be moved at a constant rate so that it arrives at the next multimedia cluster in a fixed amount of time (such as 3 seconds) chosen during presentation generation. The appearance of a given choice of icon may remain constant during the animation, or it may change. For instance, a "dot" icon might remain constant in appearance as it moves, but a "walking person" icon might be made to look like it is taking steps as it moves.

If no Current Location Icon is being used, and instead the Path Progress Indicator is visible as the junction of two different rendering styles for the path itself, then the path is modified in some manner to indicate this progress. More specifically, the progression along the path is rendered in a style indicating that it has been traversed already, starting at the start of the path and moving toward the first multimedia cluster. Once the process of block 109 is performed, all of the path between the starting location and the first multimedia cluster will have been re-rendered in the "already-traversed" style.

If the animation of the Path Progress Indicator moves too close to the edge of the displayed portion of the map, the map can be automatically scrolled (translated up, down, left, and/or right) so that the animation is better centered in the viewable portion of the map.

110: Zoom into and Render Expanded View of Multimedia Cluster

When the Path Progress Indicator reaches a multimedia cluster along the path, the presentation can automatically zoom the map into a detailed view of the cluster. The detailed view of the cluster might appear as in FIG. 4, in which a variety of icons representing multimedia files are displayed, along with the detailed rendering of path segments traversed by the person between capture of the multimedia files. The focal point of the zoom may be chosen by a variety of methods, such as by choosing the average location of the multimedia files or path locations within the cluster.

Figure 4:
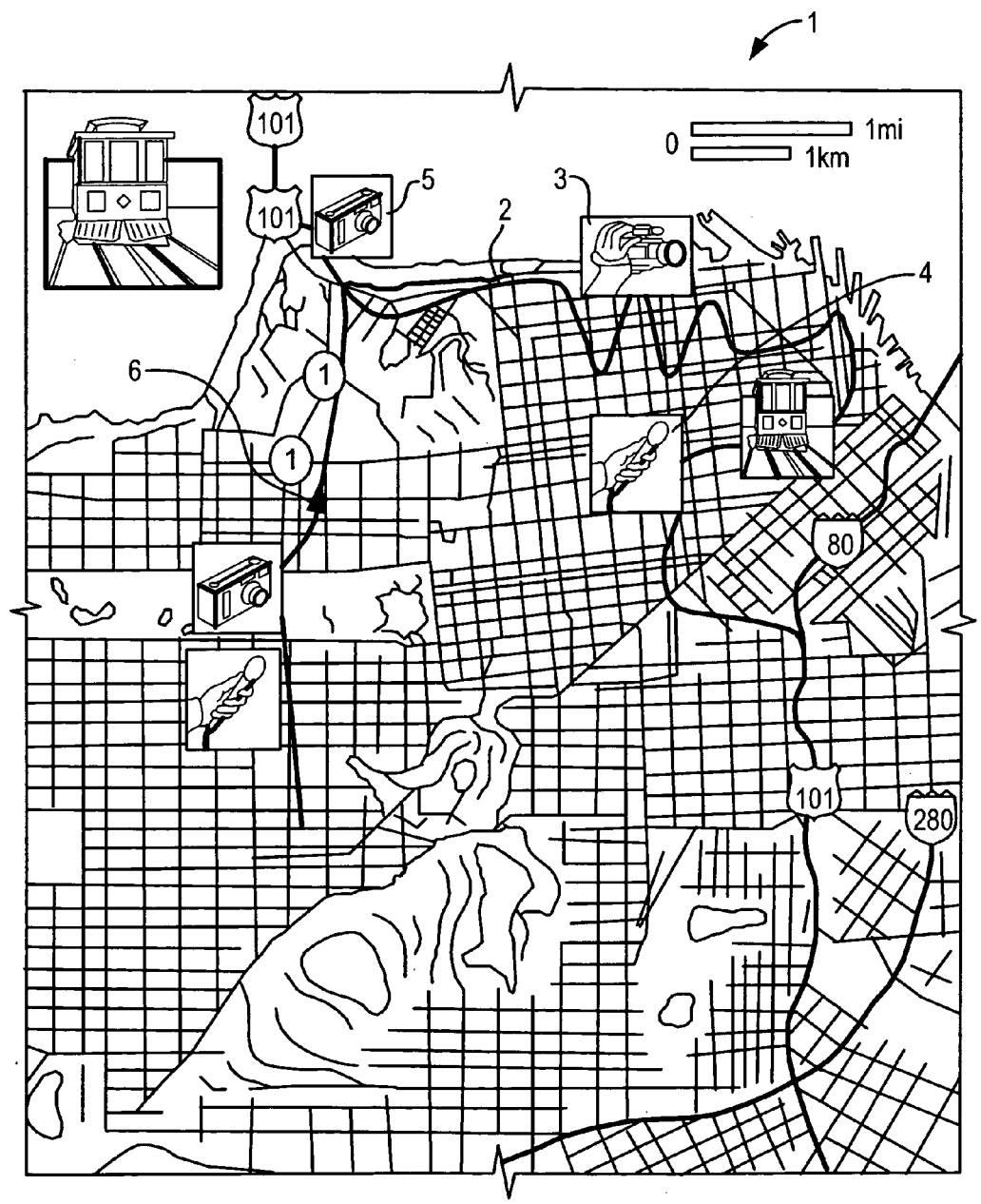
FIG. 4 shows an exemplary path and exemplary multimedia recording icons at certain locations along that path.

If the cluster contains more than one captured multimedia file, the icon for the cluster in the overall map view represents the aggregated set of multimedia in the cluster. AS the map view is zoomed into the cluster and the map resolution exceeds a sufficient threshold, the aggregated icon is resolved into individual icons for each multimedia file in the cluster, such that an icon is rendered at the capture location for each multimedia file in the cluster. Methods for choosing or constructing these icons are described in block 204, below. FIG. 4 shows an example of rendering a different style of icon for each multimedia type, with special icons 3, 4, and 5 representing capture locations of video, audio, and photographic recordings, respectively.

At resolutions for which individual multimedia icons are drawn, a representation of the region of space viewed by the camera at capture time (i.e. its "field-of-view") can be rendered for visual multimedia such as photos and videos. This may be done in any of a variety of ways, including those discussed and shown in the figures in the referenced co-pending application entitled "Systems and Methods of Viewing, Modifying, and Interacting with "Path-enhanced" Multimedia". In one style, the spatial extent of the camera field-of-view in the plane of the map is indicated by a colored or shaded region emanating from the multimedia icon location. Alternatively, an arrow emanating from the multimedia icon location can be used to indicate the central axis of the camera field of view within the ground plane. The tilt angle of the camera may optionally be indicated by the choice of color or shading of the depicted region or axis. For example, more intense shading at greater distances from the anchor point of the icon could indicate a downwards tilt, while light shading at greater distances could indicate an upwards tilt. For video media, the field-of-view may be represented as the union, or some approximation or bounding hull thereof, of all the field-of-view drawings for multiple individual frames of the video. In yet another possible rendering style, the field-of-view could be represented by a simple textual annotation.

If animation of the Path Progress Indicator in block 109 reaches the end of the path before a multimedia cluster is reached, block 110 is not performed and execution of presentation play instead skips ahead to block 115.

111: Pause to Allow Viewer to Study Zoomed View of Cluster

After the map has zoomed into the multimedia cluster, the presentation again can pause to give the viewer an opportunity to absorb the map-based context of the multimedia content he or she is about to view. The geographical relationships between the subjects of the captured multimedia, the names of the places along the path the person traveled while capturing the multimedia, and the most interesting locations within the displayed map area (based on the density of multimedia icons) may be viewed at during this time.

112: Render Multimedia in Cluster, while Optionally Animating Path Progress Indicator When the Path Progress Indicator reaches a particular multimedia cluster along the path, all multimedia files associated with the cluster are played in roughly the order of their associated time tags. The ordering is not necessarily precise, because some audio files may be played simultaneously with the display of some video files. A method for choosing the order in which to play the multimedia files is discussed in block 209. If background audio accompaniment is being played, its volume is preferably lowered while audio multimedia associated with the path is played.

While the multimedia in a cluster is played, a map showing the animation of the continuing progress along the path within the cluster is can also be displayed. In this case, the Path Progress Indicator is moved forward along the path while the multimedia in a cluster is being played, so that its position always corresponds to the location at which the currently playing multimedia was recorded. In addition, the icon corresponding to the currently playing multimedia can be highlighted in some manner, such as by differentially brightening it relative to the rest of the map, or by drawing a specially colored box around it, or by enlarging it. If field-of-view information is shown on the map for visual multimedia, then the field-of-view for the currently playing visual multimedia is also highlighted in some manner, such as by brightening it or by shading it with a special color (e.g. red). Some options for how to simultaneously display the map and play the visual multimedia include:

- The map may be shown in small sub-window of the display, in a manner like the "picture-in-picture" functionality available for many televisions.
- The man can be shown by compositing it, in a semi-transparent manner, with the multimedia being played. This technique is commonly known in the art of computer graphics and video editing as "alpha-blending". The amount of transparency of the map relative to the multimedia being played is commonly called "alpha". The choice of alpha can be made by the user, or taken from a default. It can also be varied over time, such that the map is more apparent when the playing of a particular piece of multimedia has just started or is about to stop, but less apparent toward the middle of the duration of play.
- The map can be shown in separate window from those being used to play multimedia or implement other functions. The separate map window might be placed adjacent to the other windows, or may partially overlap with the other windows, or may be spatially separated from the other windows.

Video and/or audio transition special effects can be applied between the rendering of successive multimedia files along the path within a cluster, and when initiating or terminating the sequence of multimedia file renderings. Many such transition effects are commonly known in the fields of video and audio editing, but more novel effects may also be designed and used. Examples of standard video transition effects include fades to or from black, dissolves, cuts (immediate transition, with no special effects), and wipes (e.g. a star wipe). Such transitions can be applied between two videos, two still images, or a video and a still image. When the same window is used to both render visual multimedia and display maps of the path, then some of the transitions will be between the map-based display and a particular visual multimedia file within a cluster. Examples of standard audio transitions includes cross-fades and fades to or from silence. If an audio soundtrack is being played with the presentation, then some of the transitions will be between the audio soundtrack and a particular audio multimedia file within a cluster.

113: Zoom Out to Wider View of Map and Path

After rendering of the multimedia files within a cluster has completed, the focus of the viewer can be brought again to the map view of the "path-enhanced" multimedia, by zooming out from the cluster until at least some small number (for example, just one) of successive cluster icons becomes visible on the display. As the zooming out occurs, the individual icons and rendered path elements within the cluster may be re-aggregated into a single multimedia cluster icon. The resolution at which to do this can be the same at which dis-aggregation of the cluster icon occurred during zooming into the cluster (block 110 above).

114: If End of Path Has Not Been Reached, Return to Block 109

If the path extends beyond the current multimedia cluster, the Path Progress Indicator is moved forward along the path, using the methods described in block 109 above, once the map has been zoomed out sufficiently to provide context again. Resumption of animation of the Path Progress Indicator may optionally occur concurrently with the zooming out of the map in block 113.

If the path terminates inside a cluster, then the process proceeds to block 115 rather than returning to block 109.

115: Zoom Out to Show View of Full Path, Pause

When the end of the path is reached, the map is zoomed out again to show the full path along which the multimedia was recorded. This view should correspond to that shown in block 106, and hence indicates that the presentation is completing its cycle.

116: Play Presentation Conclusion

An optional transition to a "presentation conclusion" is made, where the conclusion may include any or all of, but is not limited to, the following:

a. A black image
b. An image with the words "The End" or other words similar in meaning
c. The presentation introduction Generating a "Path-Enhanced" Multimedia Presentation In one embodiment of the invention, a compact PEM Presentation Data Structure is generated that describes how and when to play multimedia files, what to render on the map-based view of the trip and when to do so, how to animate the Path Progress Indicator, and all other information that might be used by presentation player software to play a generated presentation of the "path-enhanced" multimedia.

Figure 5:
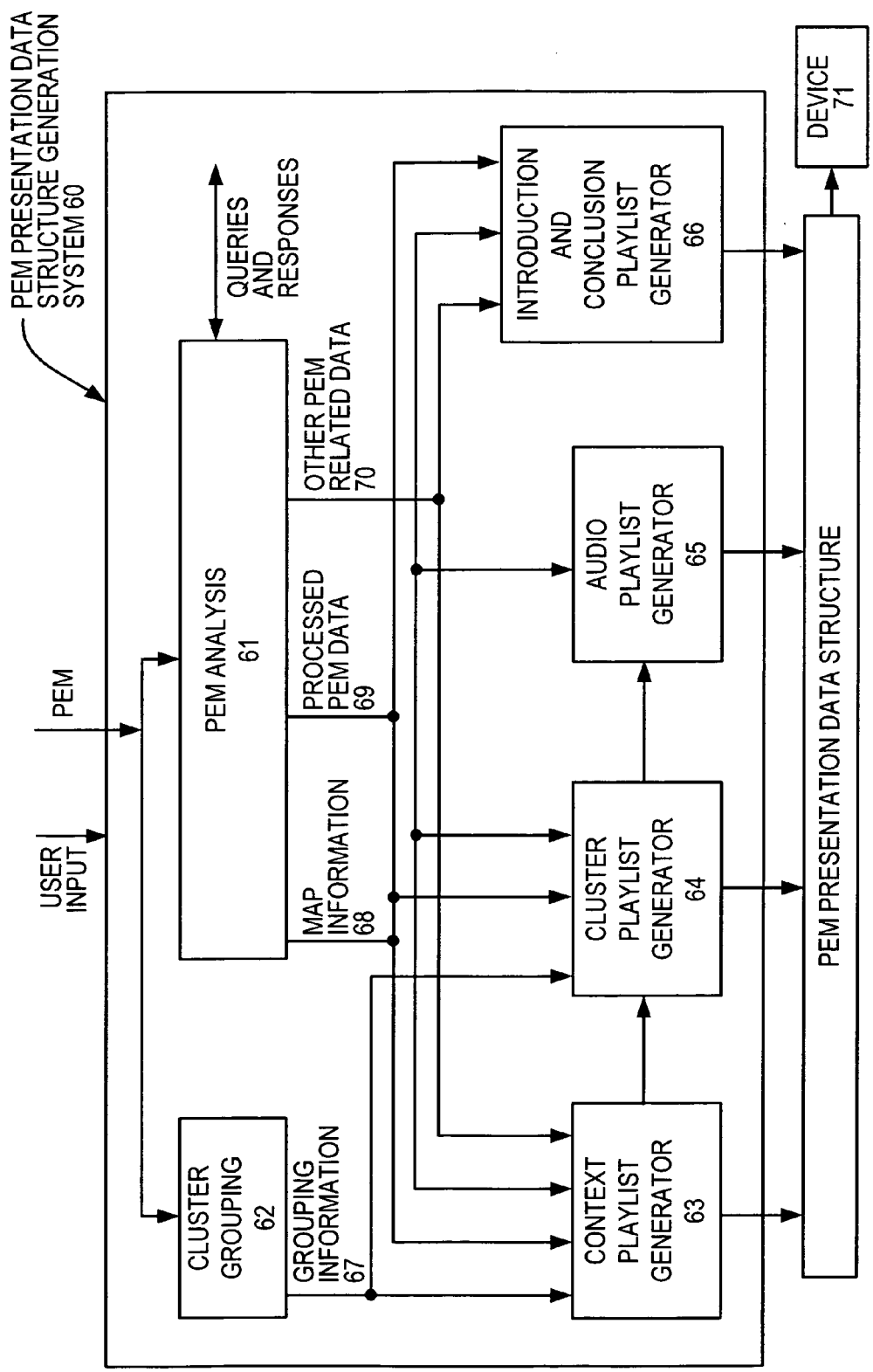
FIG. 5 illustrates an embodiment of a system for generating a PEM Presentation Data Structure.

FIG. 5 shows an exemplary embodiment of a "Path-Enhanced" Presentation Data Structure Generation System 60 including a PEM Analysis block 61, a Cluster Grouping block 62, a Context Playlist Generator block 63, a Cluster Playlist Generator block 64, an Audio Playlist Generator block 65, and an Introduction and Conclusion Playlist Generator block 66. System 60 receives as an input the "Path-Enhanced" Multimedia (PEM) and optionally a user input via a user interface, and outputs a PEM Presentation Data Structure.

In general, the PEM data is received by both the PEM Analysis block 61 and the Cluster Grouping block 62 to extract, calculate, derive, and process a variety of information and data from the PEM. PEM Analysis block 61 also uses the PEM data to formulate queries that can be sent to spatiotemporally indexed databases to obtain additional information relevant to the PEM data. For instance, the PEM data can be analyzed to determine the boundaries of a map that contains all locations in the PEM data. These boundaries can be used to formulate database queries and obtain responses to generate Map Information 68. In addition, the PEM data may be analyzed and pre-processed to minimize redundant or unwanted path portions to generate processed PEM data 69. Other PEM Related Data 70 can be generated by PEM Analysis block 61. For example, the PEM Related Data 70 can include but is not limited to statistical data derived from the PEM data, such as the length of the trip recorded within the PEM data. The PEM data is also clustered into groups by block 62 to generate Grouping Information 67 which organizes the PEM data into groups of multimedia. The Grouping information 67, Map Information 68, Processed PEM Data 69, and Other PEM Related Data 70 are all provided to the Playlist Generator blocks 63–66. The Playlist Generator blocks 63–66 function to receive the data and information (67–70) and create playlists that define the manner in which specific aspects of the presentation (e.g., clusters, audio, context, introduction, and conclusion) are played. All of the playlists and associated information form the PEM Presentation Data Structure. According to one embodiment, a system or device 71 for playing the presentation can receive the Data Structure. The Device 71 includes a software program able to interpret the Data Structure and play the presentation as defined by the playlists' entries.

Figure 6:
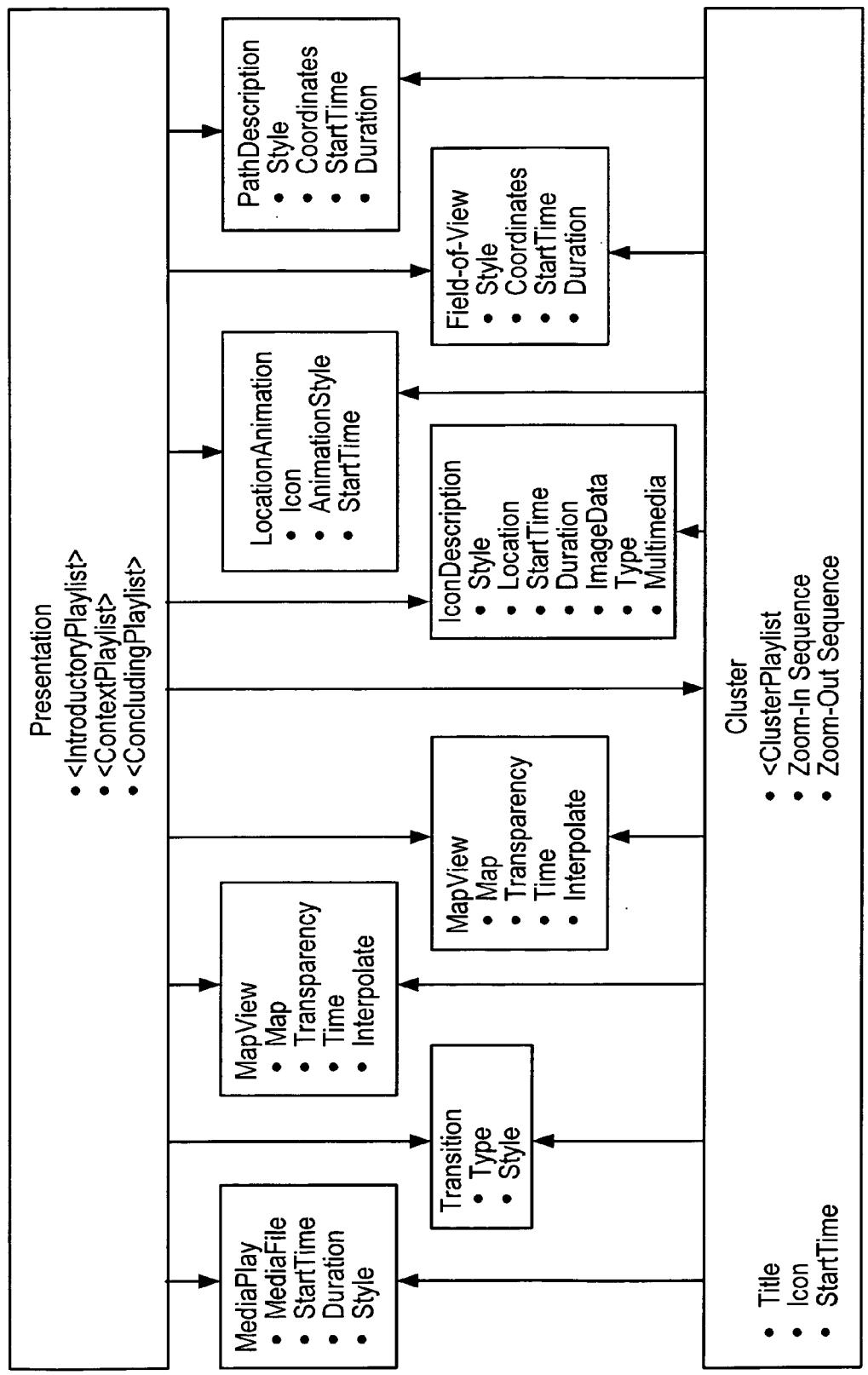
FIG. 6 illustrates an embodiment of the PEM Presentation Data Structure.

One embodiment the PEM Presentation Data Structure is shown graphically in FIG. 6. The components of this data structure are described in more detail below, and some sub-components of these components are defined and discussed in the co-pending patent application entitled "Systems and Methods of Viewing, Modifying, and Interacting with "Path-enhanced" Multimedia". The embodiment shown in FIG. 6 includes a plurality of playlists corresponding to different presentation aspects and/or portions of the presentation. In general, a playlist is a script describing what actions to take during the playing of the presentation, or more specifically, a playlist describes what animations to show, what multimedia to play, and when to initiate all such actions. Some of these actions may overlap in time. In general, the start times and durations in a playlist are synchronized and coordinated relative to a single time coordinate, and this time coordinate can be made independent of path information. Each playlist has a corresponding playlist description which may include the following Rendering Description elements: MediaPlay, Transition, MapView, LocationAnimation, Cluster, IconDescription, PathDescription, and Field-of-View.

The MediaPlay element describes how a particular, individual multimedia file is played (e.g., videos in the introduction, audio accompaniment, captured multimedia in PEM data, etc). It can contain the following information:
MediaFile [pointer]: Multimedia file to be played. For more detail on the MediaFile data structure, see the co-pending patent application entitled "Systems and Methods of Viewing, Modifying, and Interacting with "Path-enhanced" Multimedia".
StartTime [float]: When to start playing multimedia, in seconds relative to start time for playing entire Playlist.
Duration [float]: For static multimedia such as photos, this specifies the period of time to play or otherwise render the multimedia. Non-static multimedia, such as audio and video, are typically played at their standard rate, so that their duration is determined by the amount of content in the multimedia file.
Style [list of (string, string)]: Pairs of tags and values indicating how multimedia is to be played, e.g. "audio level=11", "speed=double-time", "alphaBlend=0.5", etc.

The Transition element describes any effects used to indicate the transition from the playing of one piece of content (e.g., audio, video, etc.) to another. This effect may manifest itself visually, auditorially, or via other human-perceivable means, or any combination thereof. The Transition element can include the following information:
Type [string]: For example, "fade", "dissolve", "cut".
Style [list of (string, string)]: Pairs of tags and values specifying parameters for the transition, such as the length of time over which to dissolve or fade.

The MapView element describes a particular rendering of a map. A set of MapViews can be used effectively as "keyframe" indicators of how the map display should appear at different times during the presentation. Linear interpolation of parameters (e.g. Map bounds, Map Transform parameters, display times, etc.) of successive MapViews is used to determine how to render the map (e.g. scroll, zoom, etc.) in between MapView Times. The MapView element can include the following information:
Map [pointer]: Map image to be displayed, after warping and bounds restriction. For more detail on the Map data structure, see the co-pending patent application entitled "Systems and Methods of Viewing, Modifying, and Interacting with "Path-enhanced" Multimedia".
Transparency [float]: A number from 0 to 1, with 0 indicating no transparency (map is visible and not blended with any other image) and 1 indicating full transparency (map not visible).
Time [float]: Time at which this precise view of map should be displayed.
Interpolate [Boolean]: If set to "true", the display of the map will evolve over time according to linear interpolation between the parameters, such as display bounds and warping, contained in this MapView element and the corresponding parameters contained in the next MapView element in the playlist. Linear interpolation is done over the time interval defined by the "Time" components of the two MapView elements. If "Interpolate" is set to "false", the map is displayed as specified by this MapView and is not changed until it is time to render the next MapView in the playlist.

The LocationAnimation element describes how the Path Progress Indicator, which tracks the location of the capture device along the recorded path, is animated. The Location Animation element can include the following information:
Icon [pointer to MediaFile]: Specifies the icon, if any, to be associated with the indicator of the capture device's current location. The icon can be either image or video type.
AnimationStyle [list of (string, string)]: Pairs of tags and values indicating how to move the Path Progress Indicator. Some example pairs include:
("speedScale", "1000") causes the icon to be moved along at a rate 1000 times faster than that at which the actual path was captured.
("duration", 0.52) causes the icon to be moved along the current path segment at a constant speed so that it reaches the next Cluster or multimedia capture location in 0.52 seconds.
StartTime [float]: Time at which to begin this animation, in seconds relative to start time for playing entire playlist.

The Cluster element describes how to play a group of multimedia that have been captured proximally in space and time. The Cluster element contains within itself another playlist describing how to render a group of multimedia. The Cluster element can include the following information:

Title [string]: Label to be associated with Cluster in the overall display of PEM trip, and in the title bar when multimedia in Cluster are played.

Icon [IconDescription]: The icon to be drawn on a Map to indicate the mean capture location of this group of multimedia. The IconDescription data structure is described in more detail below.

StartTime [float]: Time at which to initiate detailed presentation of the cluster, which consists of zooming into it, playing the ClusterPlaylist associated with the cluster, and then zooming out again. The data structures associated with these steps are described below.

ClusterPlaylist: Contains MediaPlay and Transition elements that describe how to play the collection of multimedia associated with this cluster after the display is zoomed into the cluster, including a description of how to play the background audio accompaniment. The ClusterPlaylist also contains LocationAnimation elements that describe how to move the Path Progress Indicator while the multimedia associated with the cluster is played. Finally, the ClusterPlaylist includes IconDescription, PathDescription, and Field-of-View elements that describe how to represent the multimedia capture locations, path segments, and visual media fields-of-view that are associated with the cluster and that should be visible when the presentation display is fully zoomed into the cluster.

<Segment> [list]: The portions of the overall PEM path connecting the captured multimedia associated with this Cluster. This provides a link between the PEM Presentation Data Structure and the original PEM data that was input into the presentation generation process. For more detail on the Segment data structure, see the co-pending patent application entitled "Systems and Methods of Viewing, Modifying, and Interacting with "Path-enhanced" Multimedia".

ZoomInSequence [MediaFile]: Pre-computed video of zooming into the cluster, in which the map resolution is increased, and the cluster icon disaggregates into individual multimedia icons, path segments, and visual media fields-of-view. This field is optional.

ZoomOutSequence [MediaFile]: Pre-computed video of zooming out of the cluster, in which the map resolution is decreased, and the individual multimedia icons, path segments, and visual media fields-of-view associated with the cluster re-aggregate into a single cluster icon. This field is optional.

The IconDescription element describes how to render an icon corresponding to a single multimedia file within the PEM data or a cluster icon corresponding to a cluster of multimedia files within the PEM data. When an icon is rendered according to an IconDescription, it is embedded into the underlying map image at a specific location and resolution, so that as the map is scrolled, zoomed, or otherwise warped according to MapView elements in a playlist, the icon representation is transformed along with the map. The IconDescription element can include the following information:

Style [list of (string, string)]: Pairs of tags and values describing the desired appearance of the rendered icon (e.g., color, image type, scale factors).

Location [(float, float)]: Coordinates at which to draw the icon on the underlying map.

StartTime [float]: Time at which to render this icon on the underlying map.

Duration [float]: Length of time to leave icon on the map. At the end of this time period, the icon is removed from the map image.

ImageData [MediaFile]: The image or video to be rendered on the map to mark the icon location. If a video is used, it can be set to loop continuously.

Type: Describes the type of multimedia (e.g., video, still photo, audio, etc.) associated with this icon. This field is not used when the icon represents a multimedia cluster.

Multimedia [MediaFile]: When the icon is being used to indicate the capture location of multimedia, this points to the multimedia file associated with this icon, thereby providing a link between the PEM Presentation Data Structure and the original PEM data that was input into the presentation generation process. When the icon represents a multimedia cluster location, this pointer is not used.

The PathDescription element describes how to render a path segment, as computed from the PEM data, on the map. When a path segment is rendered according to a PathDescription, it is embedded into the underlying map image at a specific location and resolution, so that as the map is scrolled, zoomed, or otherwise warped according to MapView elements in a playlist, the path segment representation is transformed along with the map. The PathDescription can include the following information:

Style [list of (string, string)]: Pairs of tags and values describing the desired appearance of the rendered path (e.g., color, line type, etc.).

Coordinates [list of float]: Describes the locations on the map at or between which to render the path representation.

StartTime [float]: Time at which to render this path segment on the underlying map.

Duration [float]: Length of time to leave the path segment on the map. At the end of this time period, the path segment is removed from the map image.

The Field-of-View element describes how to render a field-of-view image corresponding to the field-of-view of the multimedia on the map. When a field-of-view is rendered according to a Field-of-View, it is embedded into the underlying map image at a specific location and resolution, so that as the map is scrolled, zoomed, or otherwise warped according to MapView elements in a playlist, the field-of-view representation is transformed along with the map. The Field-of-View element can include the following information:

Style [list of (string, string)]: Pairs of tags and values describing the desired appearance (e.g. color, specification of "arrow" or "shape" style, etc.) of the rendered field-of-view overlaid upon the map.

Coordinates [list of float]: Describes the coordinates, in the coordinate system of the displayed map, defining the field-of-view.

StartTime [float]: Time at which to render this field-of-view on the underlying map.

Duration [float]: Length of time to leave the field-of-view on the map. At the end of this time period, the field-of-view is removed from the map image.

In the embodiment shown in FIG. 6, the PEM Presentation Data structure includes an Introductory Playlist, a Context Playlist, at least one Cluster Playlist, and a Conclusion Playlist. According to this embodiment, the Introductory Playlist identifies the multimedia and animations used to introduce the presentation, prior to rendering any of the multimedia or path data associated with the corresponding "Path-Enhanced" Multimedia data. The Introductory Playlist can include a series of MediaPlay element and Transition element entries, in any order. The Context Playlist includes a list of Clusters (which have their own playlists), and indicates what to show when transitioning from one Cluster to the next. The Context Playlist can include a series of Cluster element, MapView element, LocationAnimation element, Transition element, and PathDescription element entries in any order. Each Cluster Playlist describes how to play multimedia and animate the map for multimedia that was captured in one particular such Cluster. The Cluster Playlist can include a series of MediaPlay element, MapView element, Transition element, LocationAnimation element, IconDescription element, PathDescription element, and Field-of-View element entries in any order. Both the Context Playlist and the Cluster Playlist can also contain MediaPlay elements that describe how to play the background audio accompaniment. The Conclusion Playlist describes multimedia and animations used to close the presentation, after all multimedia and path data in the corresponding PEM has been shown. The Conclusion Playlist can include a series of MediaPlay element and Transition element entries, in any order.

Alternatively, the presentation generation process may output a precise frame-by-frame description of the visual content of the presentation, together with the complete audio soundtrack for the presentation. This form of presentation generation output is suitable for direct storage on CD, DVD, computer disk drives, or similar media. Such a complete description of the presentation is optionally created by passing the compact PEM Presentation Data Structure produced by the presentation generation process to software that plays the presentation (such as by Method 1, as described above), and then capturing and storing the output video and audio of the player. The stored audio and video may then be re-played in the future using conventional audio and video software and hardware players that are compatible with whatever storage media was used. This two-stage process for generating complete audio and video for the presentation is shown in the block diagram of FIG. 1, blocks 30 and 34.

An exemplary embodiment of a method for automatically generating a multimedia presentation from "path-enhanced" multimedia data as represented in FIG. 2 are now herein described.

Figure 7:
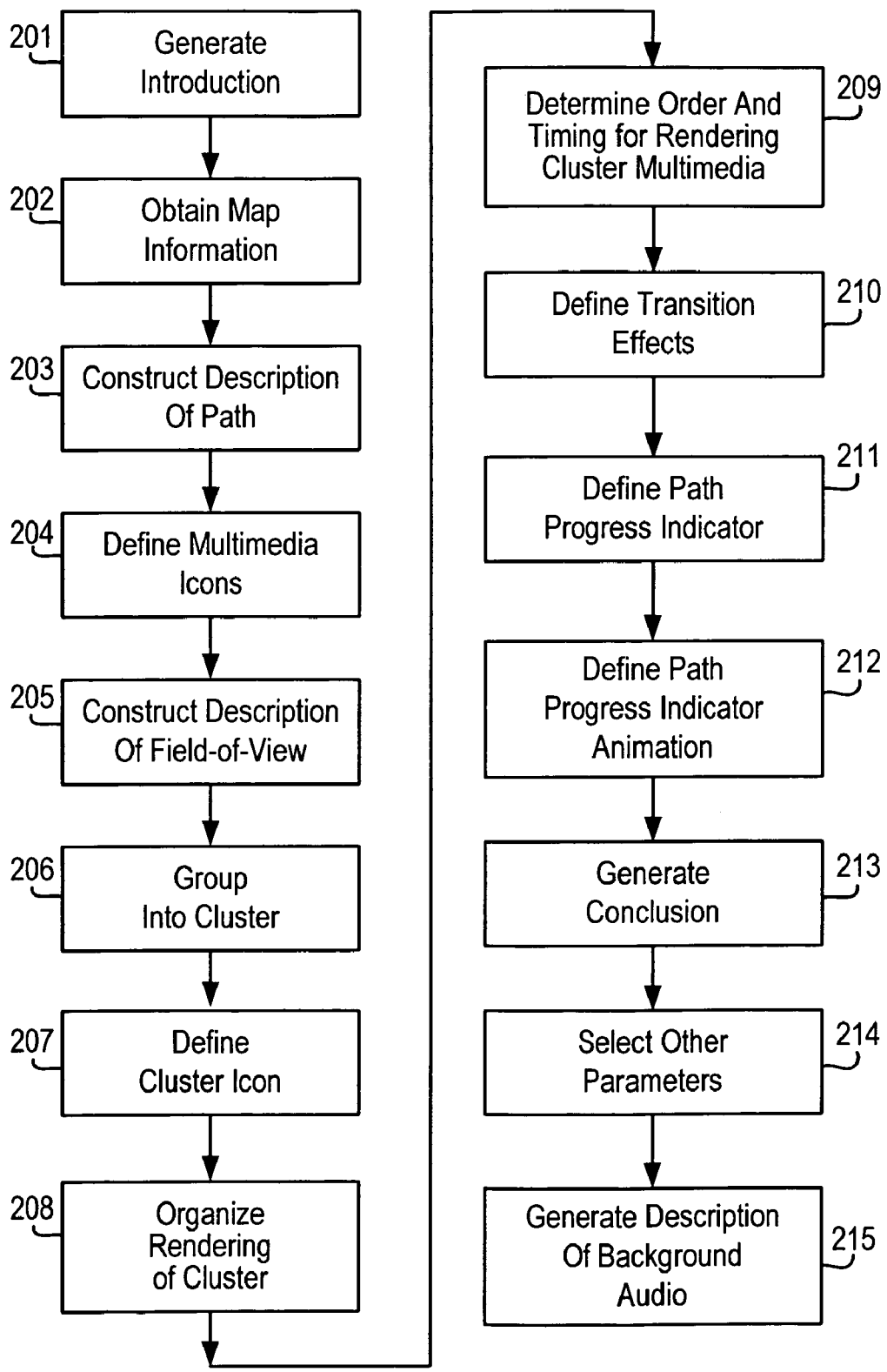
FIG. 7 is a flowchart of an exemplary process for automatically generating a multimedia presentation from a list such as in FIG. 2.

FIG. 7 illustrates one embodiment of the method of generating a PEM presentation. It should be noted that the order of blocks 201–215 do not necessarily reflect the actual order in which the process represented by each block is performed. Moreover, some blocks may not be performed at all. For instance, if default icons are used, blocks 204 and 207 may not be performed.

201: Generate Presentation Introduction

According to block 201 of FIG. 7, a "presentation introduction" is generated. The visual portion of the presentation introduction may consist of an image, a series of images, video, or any combination thereof. As discussed above in block 102, introduction images may contain text indicating any of a variety of pieces of information, including the title of the presentation, the dates of multimedia capture, names for the places encompassing the multimedia capture locations, the current date, and the identity of the person who recorded the multimedia or who is currently presenting it. They may contain various types of trip or presentation statistics, such as the total duration of the trip, the number of photos and videos recorded, or the duration of the presentation about to be shown. They may also contain one or more stock photos or drawings relevant to the content of the presentation, such as a picture of the Eiffel Tower if the path information indicates that multimedia was recorded in Paris. An introduction video may contain text indicating the same information described above for introduction images, together with animations or with stock video footage relevant to the content of the presentation.

The user can specify preferences for generating this optional introduction, and can manually add some of the desired information, such as a title or the name of the presentation creator, through a user interface. On the other hand, default actions can be taken without user intervention. For instance, the PEM data can be analyzed to determine the dates bounding the capture times of "path-enhanced" multimedia, so that these dates can be displayed in the Introduction. The name of the person who recorded the multimedia may also be derivable from the "path-enhanced" multimedia files. Moreover, databases can be queried with path information in order to select relevant stock introductory photos or to discover likely names for places that encompass the locations at which the multimedia were recorded. The co-pending patent application entitled "System and Method for Creation of Video Annotations" (U.S. patent application Ser. No. 10/426,775), assigned to the assignee of the present application and incorporated herein by reference describes methods for obtaining place names by querying geographical databases with the location coordinates associated multimedia, and similar methods may be applied to other types of databases to obtain information such as relevant stock photos or videos or local folk music. All of the queried information (e.g., stock photos), derived information (e.g., person who recorded the multimedia), default actions (e.g., transitions), and/or user specified preferences (e.g., user added introduction multimedia) can then be assembled into an Introductory Playlist which defines the manner in which the introduction of the presentation is played. Templates for Introductory Playlists may be provided for generation of an introduction having a particular style or types of information. For instance, a Template for a given Introductory Playlist may require specific information such as dates, titles, etc. to be provided (e.g., filled into fields of a user interface) which would then be used to fill-in the template to generate the Introductory Playlist.

202: Obtain Map Information

Map images suitable for display during the presentation are generated by this block. First the latitudinal and longitudinal bounds encompassing all locations in the PEM list (e.g., FIG. 2) are determined. The bounding information is used to query a map database to retrieve a map that encompasses these bounds. The maps used in generating and playing the presentation can be obtained by querying map databases, such as those provided by TeleAtlas North America, Inc. or by software mapping products like Microsoft's Streets and Trips 2002 or DeLorme's StreetAtlas 9.0, with the location information provided in the "path-enhanced" multimedia list. Any of a variety of types of map databases may be used, such as databases of road atlases, tourist maps, or satellite photographs. The queries may be implemented by the same well-known methods used in many other applications, such as those that provide driving directions between two given addresses.

In one embodiment, the presentation is optimized by ensuring that the scale of the generated map does not greatly exceed that of the geographical bounds of the path locations, so that different multimedia recording locations in the path will be more easily distinguishable when plotted on the map.

The spatial resolution at which the generated map is stored in memory can be high around locations where multimedia has been recorded, so that zooming into the map at these locations can be done without further database queries. More than one query for high-resolution sub-parts of this map can be performed to construct the full map, which then can be stitched together to form the full map, or can be stored separately and rendered on-the-fly during presentation playback as needed. Methods for retrieving partial maps and stitching them together are well known to those skilled in the art. Alternately, maps represented by vector features will allow for good quality zooming by arbitrary factors throughout the displayed region.

Determined map information can be used to form the Context Playlist and the Cluster Playlists. Specifically, the map information determines which map images are displayed and the manner in which they are displayed while multimedia is played according to the Context and Cluster Playlists.

203: Construct Description of Path to be Rendered on Map

A description of the path to be rendered on the map is constructed from the PEM data. In one embodiment, locations in the "path-enhanced" multimedia list are arranged according to time recorded, including those designated locations (if any) not having any associated multimedia. This ordered list of locations defines a path (real or imaginary) traveled by the person or people who recorded or otherwise generated the multimedia in the list. A representation of such a time-ordered list is shown in FIG. 2. The time-ordered list is converted into a representation that may be graphically rendered on a map. In one embodiment, the representation consists of a list of 2D-coordinate locations registered in the coordinate system of the map or maps gathered in block 202. In other embodiments, the path may be represented by a set of B-splines, cubic splines, or other descriptions of curves. Other representations are also acceptable, provided that a suitable method exists for graphically rendering the path on a map, as required by block 104, above.

If the path is represented as a set of 2D coordinate locations, this list may be taken to be the list of time-ordered locations in the "path-enhanced" multimedia list. Alternatively, standard curve-fitting methods can be used to "smooth" the path. In one embodiment, the curve fitting methods cause the path to deviate to some extent from the locations in the list. When curve-fitting methods are applied, the path can be represented in terms of the parameters of the fitted curves. For instance, if the path is fit with B-splines, then the final path representation may be a set of parameters for a list of B-spline segments that, when concatenated, approximate the path. In addition, optional refinements or other processing, such as automatic removal of small loops in the path and reduction of spatial jitter in the path, may be applied to the raw path data in the "path-enhanced" multimedia list, as a precursor to generating the final representation of the path. Spatial jitter may be removed by any of several well-known methods, such as by replacing each path list entry with the median, average, or weighted average of the path elements within some spatial and/or temporal window around it. Small path loops may be removed by looking for non-adjacent path elements with locations that are within some threshold distance, and whose intervening path elements fall within an area with less than some threshold size.

A description of the graphical representation of the path can be used to form the PathDescription elements that are part of the Context Playlist and the Cluster Playlists. Specifically, the PathDescription elements determine the path to be displayed on (i.e., overlaid upon) the maps according to the Context and Cluster Playlists.

204: Define Icons to Represent Multimedia Capture Locations

For each multimedia file in the presentation, an icon can be selected or constructed. The selected icon is then used to indicate the multimedia file's capture location along the path on the map during the presentation. Different icons can be selected for different types of multimedia. Icons can be selected by the user in advance, or default icons are assigned. In one embodiment, default icon selections are dependent on the type of multimedia file, so that a picture of a microphone may be used for audio recordings, a picture of a handheld video camera may be used for video recordings, and so on. FIG. 3 is a flowchart of an exemplary process for automatically performing a multimedia presentation. shows an example of this style of selecting icons, with special icons 3, 4, and 5 representing capture locations of video, audio, and photographic recordings, respectively. For visual media such as photos or videos, the default icons can also be low-resolution preview images of the media content itself. For instance, for video media, the representative icon may be a low-resolution version of a single "key frame" from the video. The selected key frame might simply be the first frame of the video, but a number of more sophisticated methods for automatic key frame extraction are known in the art of video processing and analysis, and any of these may also be used. Icon definitions determined through either icon selection or default icon assignment for each media file can be used to form the IconDescription elements that are part of the Cluster Playlists and that determine how the icon for each media file is represented during the presentation.

205: Construct Descriptions of Fields-of-View for Visual Media

For photo and video media, for each location on the path at which recording is initiated or recording parameters (such as device orientation) are changed, a text or graphic overlay is generated indicative of any available camera field-of-view information. The fields-of-view for visual media can be estimated from information such as the camera position, altitude, orientation, focal length, and imager size at the time of capture, and may be further refined through use of 3D topological map data of the Earth's surface and any man-made structures. Methods for computing the fields-of-view from such data are described in the co-pending application entitled "Apparatus and Method for Recording "Path-enhanced" Multimedia" and copending application "Systems and Methods of Viewing, Modifying, and Interacting with "Path-enhanced" Multimedia". The description of the representation of a field-of-view may consist, for example, of parameters, colors, and shadings for drawing an arrow, a 2D region, or 2D representation of a 3D shape. For example, an arrow emanating from the multimedia icon location can be used to indicate the central axis of the camera field-of-view within the plane of the map as shown in FIG. 8. As shown in FIG. 8, field-of-view data is shown symbolically on map 1 by appending an arrow to multimedia icon 5, with the direction of the arrow indicating the compass heading of the camera, and the length of the arrow indicating its approximate focus. For example, a long arrow 52*a* can indicate a distant setting in which the camera was focused on a distant object, while a short arrow 52*b* could indicate a close-up setting in which the camera was focused on a nearby object. The tilt angle of the camera may optionally be indicated by the choice of color or shading of the depicted region or arrow. For example, more intense shading of the field-of-view arrow or region at greater distances from its anchor point at the icon can indicate an upward tilt of the camera, while lighter shading at greater distances from the icon can indicate a downward camera tilt. For a field-of-view represented by an arrow, another method of indicating the camera tilt angle relative to the ground is to increase the arrow's thickness, going from the camera location to the arrow tip, in proportion to how upwardly directed the camera was. For fields-of-view represented as 2D shapes, another method of representing the camera tilt angle is to draw the 2D shape as if it is tilted relative to the map, with a shadow rendered so as to indicate the direction of its tilt. For video media, in which the field-of-view of the recording camera may vary over time, the description may be stored as a list of individual field-of-view descriptions for single video frames, along with the start times and durations over which each of these fields-of-view are applicable. For a static rendering of the field-of-view of video media, such as may be drawn when the map is zoomed into a cluster (determined by the Cluster Playlist) but before play of multimedia within the cluster has been initiated (as in block 110 above), the field-of-view may be represented as the union, or some approximation or bounding hull thereof, of all the field-of-view drawings for multiple individual frames of the video. The field-of-view descriptions can be used to form the Field-of-View elements that are part of the Cluster Playlists and that determine how the field-of-view graphical representations are displayed for each visual media file during the presentation.

206: Group Multimedia Capture Locations into Clusters

FIG. 2 shows an abstract representation of "path-enhanced" multimedia data, consisting of a list of time and location coordinates, some of which are associated with multimedia data. In this block, the "path-enhanced" multimedia list entries associated with recorded multimedia can be grouped into "clusters", according to similarities in their time and location values. Grouping can be done by applying thresholds to the time and location separations between PEM list entries. When the time and location differences between PEM list entries with associated multimedia each fall below a respective corresponding threshold, these entries are grouped into the same cluster. Two list entries with associated multimedia can be grouped into the same cluster even if they are separated by entries with no associated multimedia; these latter PEM list entries make up path segments associated with the cluster. FIG. 2 indicates two hypothetical clusters 60, 62 extracted from the list. A different Cluster Playlist is formed for each group of clustered entries.

The time and location difference thresholds can be selected by the user, or default values may be used to determine which multimedia are clustered. The user may specify that the chosen thresholds are to be used just for generation of the current presentation, or that they should be used for generation of all future presentations until otherwise specified (i.e. make these thresholds the new default settings). In one embodiment, different thresholds can be applied locally in different portions of the path. In another embodiment, clustering rules can be established that determine the permissible number of multimedia files that can be associated with each cluster, or the permissible number of clusters that a presentation may contain. In one embodiment, clustering rules may result in different thresholds in different portions of the path. For instance, if a clustering rule is established that allows a cluster to contain between 3 and 20 and multimedia files, then the time and/or distance difference thresholds may be decreased for some portion of the path containing a high density of multimedia files, in order to adhere to the clustering rules and thereby avoid the clustering of too many files into a single cluster. The clustering rules driving the threshold selection process may be taken from default settings, random selections, or user preferences, and they may be used either for generation of just the current presentation or selected as defaults for generating all future presentations until otherwise specified. Grouping thresholds and cluster rules can be applied to the PEM data so as to identify groups/clusters of multimedia files and to create a different Cluster data structure and Cluster Playlist for each identified cluster.

The mean location and time of the PEM list entries associated with the cluster are computed. These mean values are used to represent the approximate time and location of each cluster in both of Cluster and Context Playlists. For example, the cluster mean location is used as the map location at which to draw the icon representing the cluster, whose appearance is determined according to block 207.

Grouping of multimedia capture locations into clusters is an optional step in the presentation generation process. If this grouping is not performed, IconDescription, PathDescription, Field-of-View, MediaPlay and other entries that would otherwise form the Cluster Playlists are instead inserted directly into the Context Playlist

207: Define Icons for Multimedia Clusters

If multimedia capture locations have been grouped into clusters, as described for instance in block 206, icons for visually representing the grouped clusters are determined and defined from cluster features such as their ordering along the path, their multimedia contents, or their geographic location. For instance, the cluster icons could simply contain the sequential numbers of the clusters in their order along the path (e.g. "1" for the first cluster along the path, "2" for the second, and so on). A cluster icon might also contain an image derived from any of the visual multimedia in the cluster. For instance, an icon might contain a low-resolution version of one of the frames in a video associated with the cluster, or it might contain a cropped version (perhaps focusing on a face or building) of one of the photographs associated with the cluster. Images of faces may be detected with high reliability by any of several known software systems, such as the "Face-It" product sold by Visio Inc. The icon may also contain text annotations or optionally modified stock images associated with the geographic area near the cluster. For instance, a cluster located near the Eiffel Tower in Paris may be given an icon with a stock photo or other representation of the Eiffel Tower, or it may contain the text "Eiffel Tower". Such stock multimedia, place names, and other information may be obtained automatically by querying a suitable geographically-indexed database with the location coordinates of the cluster. Some methods for achieving this are described in the co-pending patent application entitled "System and Method for Creation of Video Annotations" (U.S. patent application Ser. No. 10/426,775), assigned to the assignee of present application and incorporated herein by reference. Cluster icon definitions can be used to form the IconDescription elements that are part of the Cluster data structures and that determine the manner in which the clusters are represented during the presentation.

208: Organize Cluster Rendering

Cluster rendering is organized for rendering of expanded views of multimedia clusters. In particular, when the Path Progress Indicator reaches or approaches a multimedia cluster icon, the map display is optionally zoomed inward toward the icon (see block 110 above). According to this embodiment, when the zooming causes the displayed map resolution to exceed a sufficient threshold, the cluster icon is dis-aggregated into individual icons for each multimedia file in the cluster. When this occurs, greater details about the path and about the fields-of-view for visual multimedia associated with the cluster are also optionally rendered. The resolution threshold at which the icon is dis-aggregated may be determined as the resolution at which the icons for the most widely spatially separated individual multimedia files in the cluster would not overlap if they were to be rendered on the map. Other methods for choosing a resolution threshold may also be used. In one embodiment, pre-computation of this resolution during the presentation generation process allows for its storage within the Cluster elements of the PEM Presentation Data Structure.

In one embodiment, the zooming process may occur over multiple frames of rendered video, such that as the map is increasingly zoomed, the locations of the multimedia icons on the screen will change from one frame to the next (specifically, they will spread apart), and any finer details of the path and the background map may become increasingly apparent (i.e., increased background and path image resolution). If the process of rendering each of these frames is computationally intensive for a given choice of platform and rendering settings, it may be advantageous to pre-compute images of the individual frames of the zoom, concatenate them into a video, and simply play the zoom video at the appropriate time when the presentation is played.

When playing of the multimedia files within a cluster has completed, the map display of the path will be zoomed out from the cluster, and the detailed display of cluster elements will be re-aggregated into a single representative multimedia cluster icon. Therefore, pre-computations similar to those described above for the process of zooming in can also be performed for zooming out. The same resolution threshold as was used for cluster icon dis-aggregation can be used as the threshold for re-aggregation. Pre-computation of images of individual frames of the zoom out may also be beneficial in saving computation at display time. If zooming out does not happen concurrently with forward animation of the Path Progress Indicator, then the pre-computed frames may simply be the same frames used as for the zoom in, displayed in reverse order. According to these embodiments, the Cluster element may include links to specific zoom-in and/or zoom-out videos or may include image information for increasing/decreasing image resolution during the presentation.

If grouping of multimedia capture locations into clusters has not been performed, as described for example in block 206, pre-computed zoom videos may be computed for individual multimedia capture locations and inserted into the Context Playlist. In this case, no dis-aggregation or re-aggregation of multimedia icons and other cluster elements is needed.

209: Determine Order and Timing for Rendering Multimedia Within Each Cluster

The order and timing for rendering the multimedia within each cluster is determined. According to one embodiment, the ordering and timing for playing the multimedia within a given cluster can proceed according to any of the following or any combination of the following:

1. All visual multimedia (e.g. photos, videos, text, or other images) in the cluster is played in the time order they were originally recorded (e.g., according to the abstract list shown in FIG. 2.)
2. Each visual multimedia file that consists of a single image (such as a photo or some text) is shown on the screen for a fixed duration of time. This duration may be selected by the user or taken from a default value (e.g. 10 seconds). An exception to this rule can be made if audio recordings exist in the cluster (see rule (4) below).
3. If any of the video is accompanied by an audio track, that audio is played while the video is played.
4. If the cluster contains audio recordings with no associated video, an attempt is made to find image media, or videos with no audio track, whose time and location of recording closely match that of the audio, so that the audio can be played while these other media are displayed.

One embodiment of associating audio with image media and video having no audio track can proceed as follows:

a. Identify within the PEM all image media, and all video recordings with no audio track, having time and location of recording within some threshold difference of the time and location of the audio recording. When computing these differences for a given pair of media recordings, consider both the start and end times and locations of the recordings, and use the smallest differences found. If no location data is explicitly available for the end of a media recording, estimate one by linearly interpolating the locations associated with the two list entries that are closest in time to the media recording end time. The set of visual media selected by this process may be called the "candidate set" of multimedia to be shown while playing the audio.

b. Select from this "candidate set" the minimum subset of multimedia, called the "play set", that was recorded most closely in time to the audio recording and having a total duration of display at least as long as the duration of the audio recording. For instance, if the "candidate set" contains 8 photos and no videos, and if each photo is normally displayed for 10 seconds, and if the audio recording is 30 seconds in duration, select the three photos that were recorded most closely in time to the audio recording.

c. Play of the audio recording is initiated when the first media in the "play set" is displayed.

d. If the total normal duration of display of the multimedia in the "candidate set" is less than the duration of the audio, then the entire "candidate set" is used as the "play set". Audio play is initiated when the first media in the "play set" is displayed, and the last media of the "play set" is displayed on the screen beyond its normal duration until the audio has finished playing.

e. If there are no multimedia in the "play set", then the map with the animated Path Progress Indicator is displayed while the audio is played.

f. If "play sets" for different audio recordings overlap, display times for visual media that occur in both sets are extended beyond their normal lengths so that the total duration of the play sets equals the total duration of the audio recordings to be played.

If grouping of multimedia capture locations into clusters has not been performed, as described for example in block 206, the above method can be applied to the full collection of multimedia capture locations as if they were all grouped into a single cluster.

210: Define Transition Effects

Video and/or audio transition special effects can be defined between the rendering of successive multimedia files along the path, and when initiating or terminating the sequence of multimedia file renderings. Many such transition effects are commonly known in the fields of video and audio editing, but more novel effects may also be designed and used. When choosing what transition effect to apply at a particular transition opportunity, the choice can always be the same within a given presentation, or a different choice can be made each time by randomly selecting from a list of transition types. Default choices or lists of choices can be made without user assistance, or they may be made while accounting for relative user preferences among these choices. Possible types of video transitions to be used include, but are not limited to:

Cut (immediate transition, with no special effects)
Fade to/from black
Dissolve
Horizontal wipe
Star wipe Possible types of audio transitions include, but are not limited to:

Cut (immediate transition, with no special effects)
Cross-fade
Fade to/from silence or music Transition definitions can be stored within both the Context and Cluster Playlists to determine the manner in which transitions will appear during the presentation.

211: Define Path Progress Indicator

An indicator, generally referred to as a "Path Progress Indicator", indicates the progress along the path during the presentation. In one embodiment, the Path Progress Indicator is an icon (referred to a "Current Location Icon") that is drawn to represent the position of the person who recorded the multimedia during the trip, and therefore moves along the path as the presentation is played. Selection of this icon can be made by the user or a default or automatic icon selection process can be used. The icon can include but is not limited to the following icon types:

a colored dot with width twice that of the line used to draw the path
a large arrowhead oriented along the direction that the path is traveled
a drawing of some sort of vehicle, such as a car, airplane, or boat
an animation (a series of images that loop continuously) of something walking, such as a person or a camel. The animated person could be a custom caricature of the person who actually took the trip.

In one embodiment, the choice of Current Location Icon can vary over time. The determination of how the icon varies (with respect to time and appearance) can be user selected or automatically set. In one embodiment, the icon is automatically varied such that a different Current Location Icon is displayed at the start of each path segment, where a "path segment" might be the path between successive "path-enhanced" multimedia list entries, the path between successive multimedia recording locations, or the path between successive multimedia clusters. The choice for a given path segment may be based on a number of factors, including:

the time duration of the current and neighboring path segments
the physical length of the current and neighboring path segments
the time of day at which the current and neighboring path segments were recorded
the type of terrain underlying the current and neighboring path segments
temperature along the path
the types of multimedia recorded along the current and neighboring path segments For instance, an "airplane" icon might be used for a path segment that appears to cover a large distance in a short time, while a "walking person" icon might be used for path segments that appear to meander slowly through an urban area and are associated with many multimedia files. Similarly, a series of short segments that occurred during the day in an Egyptian desert area might cause an "animated camel" icon to be selected as the Current Location Icon. One somewhat general method for automatically selecting the Current Location Icon for each path segment proceeds as follows:

1. Choose a general class of "vehicle" for the icon, based on the speed of travel and the underlying terrain. Classes include "air vehicle", "water vehicle", "road vehicle", "train", or "walking". This last class includes both walking people, as well as walking animals. Example rules include:

Use "air vehicle" if the speed of travel exceeds some threshold, such as 150 kilometers per hour.
Use "water vehicle" if the speed is not in excess of the threshold used in (i), but the terrain is water.
Use "train" if the path appears to travel along a known rail route for a sufficient distance, such as 10 kilometers, and the average speed over the segment exceeds a second threshold, such as 30 kilometers per hour.
Use "road vehicle" if the average speed over the segment exceeds some threshold, such as 30 kilometers per hour, and the route appears to be near known roads on the map.
If all other rules do not apply, use "walking".

2. Select an icon within the class by applying additional heuristic rules that examine the time of day, the quantity of multimedia recorded, map-based transit information, and knowledge of the local culture. Some examples include:

If the time of day is "night", modify the icon with a small "half-moon" symbol in one corner.
If the average speed is very slow over some segment (e.g. less than 1 kilometer per hour), but the rate of multimedia capture exceeds some threshold such as more than 1 capture per 10 minutes, choose a "walking person" icon, possibly with a camera raised to its head.
If the path segment seems to follow a known subway system route, use an icon representing that subway.
If camels are commonly used for transport by the local people, and the "walking" class of icon has been selected already, choose a "walking camel" icon.

The Path Progress Indicator may also be rendered through dynamic modifications to the appearance of the path itself, without any use of a Current Location Icon. More specifically, the current location may be indicated by rendering path segments that have already been traversed in one style, and path segments yet to be traversed in another style. In such a method, the Path Progress Indicator is thus visible as the junction at which the path rendering style changes. The user may be given the choice (through a user interface) of whether or not to use this type of Path Progress Indicator rendering, or the choice may be made automatically. This choice may be preferable when there is little information in the "path-enhanced" multimedia that would be applicable by the system to any rules it has for selecting Current Location Icons. Examples of the Path Progress Indicator represented through modifications to the path can include but are not limited to any of the following, or any combination thereof:

Render already-traversed path in one color (e.g. red), and yet-to-be-traversed path in another color (e.g. blue). Colors may be selected automatically or at the user's discretion.

Render already-traversed path in one line style (e.g. dashed), and vet-to-be-traversed path in another (e.g. solid). Styles may be selected automatically or at the user's discretion.

Render already-traversed path in one dynamic style (e.g. pulsating), and yet-to-be-traversed path in another (e.g. non-pulsating). Styles may be selected automatically or at the user's discretion.

The Path Progress Indicator definition is specified by the LocationAnimation element, which can be included both within the Context and Cluster Playlists to determine the manner in which progress is displayed along the path during the presentation.

212: Define Animation Style for Path Progress Indicator

The movement of the Path Progress Indicator along the path is referred to as "animation" of the Indicator. The choice of the animation style (i.e., how the movement is shown), as well as the parameters for the chosen style, can be set by a user or taken from defaults. One motion parameter that can be determined for the Path Progress Indicator is the speed of its motion along the path. The speed may vary depending on what portion of the path is currently being traversed. In one embodiment, animation speed is selected/defined according to one of the following methods:

Move the Path Progress Indicator at a speed proportional to that at which the path was actually traversed by the person. For instance, using our example list of FIG. 2, if a person spent 1 minute going from Location1 to Location2, but 2 minutes going from Location2 to Location3, we might move the icon between these pairs of locations in 1 second and 2 seconds, respectively. One method for choosing the proportionality constant for the speed is to select the total time (e.g. 2 minutes) to be spent on animating the Path Progress Indicator across all path segments, and then scale all the animation times by the same factor so that they add up to this selected total animation time. The proper scale factor is calculated as "Total Animation Time/Total Travel Time", where the "Total Animation Time" is the selected total time to be spent on animating the Path Progress Indicator across all path segments, and "Total Travel Time" is the total real time spent by the traveler (s) in traversing the real path during recording of the input "path-enhanced" multimedia. The Total Animation Time may be selected by the user, or determined automatically, for example, as some percentage of the total time that will be spent playing multimedia associated with the trip.

Move the Path Progress Indicator along the path using a fixed time (e.g. 5 seconds) to go from one cluster location to the next. The same fixed time is used for animations along all such path segments. The choice of fixed time to employ can be selected by the user or determined automatically, (e.g., from a default fixed time).

When a Current Location Icon is used as the Path Progress Indicator, the appearance of the choice of icon may remain constant during the animation, or it may change. For instance, a "dot" icon might remain constant in appearance as it moves, but a "walking person" icon might be made to look like it is taking steps as it moves. In one embodiment, animations of Current Location Icons are implemented by storing icons as videos or as multi-frame GIF images. The videos or images can then be overlaid upon the displayed map and moved along the displayed path during the presentation.

213: Generate Presentation Conclusion

A conclusion can be generated and can include any or all of, but is not limited to, the following:

A black image

An image with the words "The End" or different wording with similar meaning

The presentation introduction, or something similar to it but with different content.

214: Select Other Presentation Parameters

Other parameters can be selected to determine the manner in which the presentation is to be played. Each of these may be taken from default settings, computed from various heuristics applied to the "path-enhanced" multimedia data, specified at least in part by the user, or any combination thereof. The following list of additional presentation parameters can be determined:

The length of time to pause to allow the presentation viewer to study a map of the entire trip.

The number of multimedia clusters that should be visible on the map display when animating the progress along path segments outside of any multimedia cluster.

Parameters for how closely the Path Progress Indicator may approach the edge of the displayed map before requiring the map to be scrolled, and parameters for the style of scrolling (e.g. constant speed, or with nonlinear startup and slowdown), how fast to scroll, and how much.

These selected parameters are used in generating the Map-View elements that can be included within the Context and Cluster Playlists so as to cause the presentation to be displayed according to the selected parameters.

215: Generate Description of Presentation Background Audio

A background audio accompaniment to be played during the presentation is generated. The background audio accompaniment, as described in connection with block 101 (FIG. 3), can consist of a list of individual audio elements—such as songs, musical pieces, sound effects, or famous audio speech clips—together with the times at which to start playing them. The background audio accompaniment may also contain periods of silence. In one embodiment, a user can select both the audio elements and the order and timing of their playing. In another embodiment, audio elements within the accompaniment can be selected and the order and timing of the playing of the elements may be determined dynamically. Alternatively, portions of the presentation may have dynamic audio selection while other portions may have specific user selected order, timing and/or audio elements.

Default lists of audio elements, such as songs, can be supplied so that audio element selection can operate without user intervention. Alternatively, given the path information in the list, a geographically-organized music database can be queried to generate lists of appealing music that are representative of the region in which the multimedia was recorded. Methods for accomplishing this are described, for example, in the co-pending patent application entitled "System and Method for Creation of Video Annotations" (U.S.

patent application Ser. No. 10/426,775), assigned to the assignee of the present application and incorporated herein by reference. In one embodiment, the user can designate a list of files containing audio elements to be played, and can further designate the order in which these files are to be played. The user can also allow the system to randomly select the order in which to play the audio elements on a selected list. For randomly ordered audio element play, a new random order can be selected each time the presentation is played, or the user can specify that the random ordering be selected one time and used for all future presentations until otherwise specified. All of these preferences can be established within the background audio playlist generator one time so that they apply to the generation and playing of many presentations, or they can be chosen each time a presentation is generated.

In one embodiment, a list of audio control commands (such as to increase or decrease volume at certain times during the presentation) and their timing can be generated. The audio description can also include the manner in which switching between audio elements is to be done (e.g., pausing or fading). The background audio description is included within the MediaPlay elements that may form part of the Context and Cluster Playlists.

The audio transition times can be selected such that they are synchronized to occur first near times when the path progress indicator (6, FIG. 4) reaches or leaves a multimedia cluster, or during transitions between the playing of different multimedia within a cluster. Hence, the soundtrack selection process optimally occurs after the duration and timing of various presentation subcomponents has been determined, as previously described.

The exemplary methodology described in connection with FIG. 7 can generate complete presentations with varying levels of user participation, including no participation beyond the user's providing the "path-enhanced" multimedia input.

Alternatively, a user can customize the presentation by map-based editing of the path information prior to its being input to the presentation generation system. Methods and data structures for supporting and implementing path-editing operations are discussed in the co-pending patent application entitled "Systems and Methods of Viewing, Modifying, and Interacting with "Path-enhanced" Multimedia".

In one embodiment, user-selectable parameters employed during presentation generation, such as the choice of Path Progress Indicator, the style of its animation, features of the Introduction and Conclusion, and transitions between the display of different visual media, may be chosen through the use of pre-packaged presentation "themes", "styles" or "templates". For example, the presentation generation system may offer the user, through a drop-down menu, dialog box, or other means, the choice of themes such as "Family Vacation", "Business Trip", "Birthday Event", or "Data-Gathering Expedition". If the user selects one of these themes, many of the default parameters for presentation generation are modified in a consistent manner to help produce a presentation that is appropriate for the theme title. The user may be asked to supply via a user interface specific information, such as a presentation title or author name, that is need to generate the presentation according to the selected theme or template.

The video and audio that is output during presentation playback may be stored for future use on, for example, a DVD or CD-ROM, so that the presentation generation does not need to be repeated when the user wants to present it again in the future. This effectively allows the "publishing" of presentations in formats that are consumable on standard multimedia players.

The person viewing the presentation is preferably provided with known methods for controlling the play of audiovisual media. For instance, the viewer may pause, rewind, or fast-forward the presentation, and he can seek directly to desired portions of the presentation. In the case in which the presentation is played by a software package that understands and can render the presentation from a playlist structure, then this software can include methods for servicing these conventional playback control requests.

In one embodiment, navigation through (e.g., skip ahead or back) the presentation can be achieved via a map-based interface. Specifically, when the map showing the path and the multimedia recording locations is being displayed during the presentation, the viewer is allowed to select a new path location or multimedia recording location at which to begin playing of the presentation. Location selection can be made by any of a number of standard means, including a computer mouse when the display is connected to a computer. The map can be zoomed in or out, or scrolled, during the location selection process. Once selection is made, the Path Progress Indicator is deleted from its current location and redrawn at the selected location, and the playback of the presentation resumes using the "path-enhanced" multimedia information for the selected location. The resumption of playback is optionally preceded by a brief zoom-out of the map display, to provide some geographical context for the new location at which playback will resume.

Thus it will be seen that by using time and location information to automate the organization of multimedia into a coherent framework, and by displaying indicators of that time and location information to provide context for the multimedia being displayed, the viewing of the multimedia is not only simplified, but also enhanced. Other implementations and enhancements to the disclosed exemplary apparatus and processes will doubtless be apparent to those skilled in the art, both today and in the future. For example, it could be integrated into a suitable "path-enhanced" multimedia recording device.

The invention claimed is:

1. A machine-implemented multimedia method, comprising:
receiving path-enhanced multimedia (PEM) data including a sequence of points corresponding to at least one spatiotemporal path and links between at least one multimedia object and at least one respective point on the at least one spatiotemporal path, wherein at least one spatiotemporal path includes at least one point unlinked to any respective multimedia object;
generating a structured specification for rendering a presentation including at least a portion of the PEM data, wherein at least a portion of a given spatiotemporal path is represented by a substantially continuous sequence of points overlaid on a corresponding portion of a map of a geographic region encompassing spatial bounds of at least a portion of the received PEM data; and
storing the structured specification on a machine readable medium.

2. The method of claim 1, wherein each point on a given spatiotemporal path is associated with time data, at least one point on a given spatiotemporal path additionally is associated with geographic location data, and at least one point on a given spatiotemporal path additionally is associated with a multimedia object reference component for linking a point to an associated multimedia object.

3. The method of claim 1, further comprising computing the spatial bounds of the geographic region from the received PEM data.

4. The method of claim 3, further comprising querying a database for map information corresponding to the computed spatial bounds.

5. The method of claim 1, further comprising computing temporal bounds of at least a portion of the received PEM data.

6. The method of claim 1, wherein generating the structured specification comprises constructing from the received PEM data a description of at least a portion of the given spatiotemporal path.

7. The method of claim 6, wherein constructing the path description comprises constructing an ordered list of two-dimensional coordinates registered to coordinates of the map from spatial component data of points on at least a portion of the given spatiotemporal path.

8. The method of claim 1, wherein generating the structured specification comprises associating graphical icons with multimedia objects linked to points on the given spatiotemporal path.

9. The method of claim 1, wherein generating the structured specification comprises specifying a graphical representation of a field-of-view for a given visual multimedia object linked to a point on the given spatiotemporal path.

10. The method of claim 1, wherein generating the structured specification comprises grouping PEM data points into clusters and associating graphical icons with clusters.

11. The method of claim 10, wherein PEM data points associated with multimedia objects are grouped into clusters based on values for at least one of the spatial components and the temporal components of the associated points.

12. The method of claim 11, wherein grouping PEM data points comprises comparing a threshold to differences between component values of pairs of PEM data points.

13. The method of claim 10, wherein the structured specification includes a specification for rendering a sequence of views of a cluster and wherein the sequence of views contains at least one view containing a graphical icon representing the cluster and at least one view containing a set of graphical icons representative of multimedia objects in the given cluster.

14. The method of claim 1, wherein the structured specification prescribes that multimedia objects in the given spatiotemporal path are to be rendered in a sequence ordered in accordance with capture times respectively associated with the visual multimedia objects.

15. The method of claim 1, wherein generating the structured specification comprises defining at least one path progress indicator wherein a path progress indicator definition specifies at least one graphical icon to be rendered at a current path location.

16. The method of claim 15, wherein the path progress indicator definition specifies a first style for rendering path segments already traversed and a second style different from the first style for rendering path segments yet to be traversed.

17. The method of claim 1, wherein generating the structured specification comprises associating non-PEM data to at least one point of the spatiotemporal path.

18. The method of claim 1, wherein generating the structured specification comprises automatically querying a database based on the received PEM data, and incorporating data received in response to the querying into the structured specification.

19. The method of claim 1, wherein generating the structured specification comprises generating a specification for rendering at least one of an introduction and a conclusion for the presentation.

20. The method of claim 1, wherein the structured specification includes a data structure including at least one playlist describing at least one rendering action selected from: play a multimedia file; draw at least a portion of the map; draw a representation of a path segment; draw an indicator of a current location along a path; draw a representation of a multimedia capture location; and draw a representation of a field-of-view associated with a visual multimedia object.

21. The method of claim 1, wherein generating the structured specification comprises prompting a user to input information.

22. The method of claim 1, further comprising rendering the presentation as specified by the structured specification.

23. The method of claim 22, wherein rendering the presentation comprises:
displaying a graphical representation of at least a portion of the given spatiotemporal path overlaid on an image of a corresponding portion of the map;
displaying a path progress indicator on the graphical path representation traversing the graphical path representation over time;
rendering a multimedia object associated with a point on the given spatiotemporal path when the path progress indicator reaches a corresponding point on the graphical path representation.

24. The method of claim 23, wherein rendering the presentation comprises rendering the portion of the given spatiotemporal path and the map at a variable resolution level selected based on numbers of renderable objects near the path progress indicator as the path progress indicator traverses the graphical path representation.

25. A multimedia system, comprising at least one processing module operable to:
receive path-enhanced multimedia (PEM) data including a sequence of points corresponding to at least one spatiotemporal path and links between at least one multimedia object and at least one respective point on the at least one spatiotemporal path, wherein at least one spatiotemporal path includes at least one point unlinked to any respective multimedia object;
generate a structured specification for rendering a presentation including at least a portion of the PEM data, wherein at least a portion of a given spatiotemporal path is represented by a substantially continuous sequence of points overlaid on a corresponding portion of a map of a geographic region encompassing spatial bounds of at least a portion of the received PEM data; and
store the structured specification on a machine readable medium.

26. A machine-readable medium storing machine-readable instructions for causing a machine to:
receive path-enhanced multimedia (PEM) data including a sequence of points corresponding to at least one spatiotemporal path and links between at least one multimedia object and at least one respective point on the at least one spatiotemporal path, wherein at least one spatiotemporal path includes at least one point unlinked to any respective multimedia object;

generate a structured specification for rendering a presentation including at least a portion of the PEM data, wherein at least a portion of a given spatiotemporal path is represented by a substantially continuous sequence of points overlaid on a corresponding portion of a map of a geographic region encompassing spatial bounds of at least a portion of the received PEM data; and store the structured specification on a machine readable medium.

27. A multimedia system, comprising:

a machine-implemented accessing module configured to receive path-enhanced multimedia (PEM) data including a sequence of points corresponding to at least one spatiotemporal path and links between at least one multimedia object and at least one respective point on the at least one spatiotemporal path, wherein at least one spatiotemporal path includes at least one point unlinked to any respective multimedia object;

a machine-implemented presentation generation module configured to generate a structured specification for rendering a presentation including at least a portion of the PEM data, wherein at least a portion of a given spatiotemporal path is represented by a substantially continuous sequence of points overlaid on a corresponding portion of a map of a geographic region encompassing spatial bounds of at least a portion of the received PEM data; and a machine-implemented rendering module configured to render the presentation.

* * * * *

UNITED STATES PATENT AND TRADEMARK OFFICE
CERTIFICATE OF CORRECTION

| | |
|---|---|
| PATENT NO. | : 7,149,961 B2 |
| APPLICATION NO. | : 10/427582 |
| DATED | : December 12, 2006 |
| INVENTOR(S) | : Michael Harville et al. |

Page 1 of 1

It is certified that error appears in the above-identified patent and that said Letters Patent is hereby corrected as shown below:

In column 1, line 29, delete "Multimedia"" and insert -- Multimedia" --, therefor.

In column 11, line 29, delete "man" and insert -- map --, therefor.

In column 27, line 10, delete "vet-to-be-traversed" and insert -- yet-to-be-traversed --, therefor.

Signed and Sealed this

Eighth Day of December, 2009

David J. Kappos
*Director of the United States Patent and Trademark Office*